US009901886B2

(12) United States Patent
Kim et al.

(10) Patent No.: US 9,901,886 B2
(45) Date of Patent: Feb. 27, 2018

(54) REFRIGERATOR AND CONTROLLING METHOD THEREOF

(71) Applicant: SAMSUNG ELECTRONICS CO., LTD., Suwon-si, Gyeonggi-do (KR)

(72) Inventors: Woo-Sung Kim, Gwangju (KR); Jung Yeob Kim, Gwangju (KR); Sung Ho Cho, Gwangju (KR); Kyung-Tae Ko, Gwangju (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 49 days.

(21) Appl. No.: 14/617,334

(22) Filed: Feb. 9, 2015

(65) Prior Publication Data
US 2015/0224455 A1 Aug. 13, 2015

(30) Foreign Application Priority Data
Feb. 10, 2014 (KR) ........................ 10-2014-0015013

(51) Int. Cl.
*A23L 2/54* (2006.01)
*B01F 3/04* (2006.01)
(Continued)

(52) U.S. Cl.
CPC ............ *B01F 3/04815* (2013.01); *A23L 2/54* (2013.01); *B01F 3/04106* (2013.01); *B01F 3/04808* (2013.01); *B01F 15/0022* (2013.01); *B01F 15/00253* (2013.01); *B67D 1/0014* (2013.01); *B67D 1/0884* (2013.01);
(Continued)

(58) Field of Classification Search
CPC .............. B01F 3/04815; B01F 3/04808; B01F 15/0022; A23L 2/54; F25D 23/126; B67D 1/0014; B67D 1/0884; B67D 1/0888

USPC ....... 99/279, 295, 323, 323.1–323.3; 426/67, 426/487; 261/72.1, 38, 42, 65, 26, 119.1,
(Continued)

(56) References Cited

U.S. PATENT DOCUMENTS

2002/0092868 A1 7/2002 Newman et al.
2004/0261443 A1* 12/2004 Crisp, III ............. B67D 1/0057
62/390
(Continued)

FOREIGN PATENT DOCUMENTS

EP 1 579 905 A2 9/2005
EP 1579905 A2 * 9/2005 ................ B01F 3/04

OTHER PUBLICATIONS

Extended European Search Report dated Jun. 16, 2015 in corresponding European Application No. 15153663.8.
(Continued)

*Primary Examiner* — Phuong Nguyen
(74) *Attorney, Agent, or Firm* — Staas & Halsey LLP

(57) ABSTRACT

A refrigerator and a control method thereof are provided. The refrigerator includes a carbonated water producing apparatus configured to produce carbonated water by supplying water and carbon dioxide gas to a carbonated water tank, a user interface configured to display information of carbonated water concentration, and a control unit configured to control the carbonated water producing apparatus to produce the carbonated water according to the information of carbonated water concentration, wherein the user interface displays a set concentration of the carbonated water and a present concentration of the carbonated water.

11 Claims, 26 Drawing Sheets

(51) Int. Cl.
  *B01F 15/00* (2006.01)
  *F25D 23/12* (2006.01)
  *B67D 1/00* (2006.01)
  *B67D 1/08* (2006.01)
  *B67D 1/12* (2006.01)

(52) U.S. Cl.
  CPC ......... *B67D 1/0888* (2013.01); *F25D 23/126* (2013.01); *B67D 2001/1263* (2013.01); *F25D 2400/361* (2013.01)

(58) Field of Classification Search
  USPC ....... 261/121.1; 62/393, 390, 389, 440, 441, 62/189, 66
  See application file for complete search history.

(56) References Cited

U.S. PATENT DOCUMENTS

| | | | |
|---|---|---|---|
| 2011/0134716 A1* | 6/2011 | Seiwert | C02F 1/685 366/101 |
| 2012/0102993 A1* | 5/2012 | Hortin | F25D 23/126 62/189 |
| 2013/0309361 A1 | 1/2013 | Kyong et al. | |
| 2014/0242219 A1 | 8/2014 | Cho et al. | |
| 2015/0053271 A1 | 2/2015 | Ko et al. | |
| 2016/0059192 A1 | 3/2016 | Jeong et al. | |

OTHER PUBLICATIONS

European Intention to Grant dated Nov. 7, 2017 in corresponding European Patent Application No. 15 153 663.8.

\* cited by examiner

REFRIGERATOR AND CONTROLLING METHOD THEREOF

CROSS-REFERENCE TO RELATED APPLICATIONS

This application is related to, and claims the priority benefit of, Korean Patent Application No. 10-2014-0015013, filed on Feb. 10, 2014 in the Korean Intellectual Property Office, the disclosure of which is incorporated herein by reference.

BACKGROUND

1. Field

Embodiments of the present disclosure relate to a refrigerator, and more particularly, a refrigerator including an apparatus for producing carbonated water and a control method of the refrigerator.

2. Description of the Related Art

A refrigerator is a home appliance including a storage chamber to store food, and a cold air supplier to supply cold air to the storage chamber in order to keep food fresh. To satisfy consumer demand, such a refrigerator may be provided with an icemaker to make ice, and a dispenser to allow the user to take water or ice out of the refrigerator from outside of the refrigerator without opening a door.

There are demands for providing processed beverages from the refrigerator, as well as purified water or ice, but a refrigerator typically provides only purified water or ice to a user but does not provide processed beverages.

SUMMARY

It is an aspect of the present disclosure to provide a refrigerator capable of an intake of carbonated water and configured to allow a user to clearly recognize a set concentration of carbonated water in distinction from a present concentration of carbonated water related to carbonated water production, and a control method of the refrigerator.

It is an aspect of the present disclosure to provide a refrigerator configured to allow a user to easily verify an amount of remaining carbonated water related to discharging carbonated water.

Additional aspects of the present disclosure will be set forth in part in the description which follows and, in part, will be obvious from the description, or may be learned by practice of the invention.

In accordance with an aspect of the present disclosure, a refrigerator includes a carbonated water producing apparatus configured to produce carbonated water by supplying water and carbon dioxide gas to a carbonated water tank, a user interface configured to display information of carbonated water concentration, and a control unit configured to control the carbonated water producing apparatus to produce the carbonated water according to the information of carbonated water concentration, wherein the user interface may display a set concentration of the carbonated water and a present concentration of the carbonated water.

The control unit may control the carbonated water producing apparatus so that the carbonated water producing apparatus may supply the carbon dioxide gas at least once according to the set concentration.

The user interface may receive the set concentration from a user.

The control unit may control the user interface so that the user interface may display the present concentration of the carbonated water according to a number of times the carbon dioxide gas is supplied.

The control unit may calculate a supply time of the carbon dioxide gas based on the present concentration of the carbonated water.

The user interface may display an amount of remaining carbonated water stored in the carbonated water tank.

The refrigerator may further include a dispenser configured to discharge the carbonated water.

The control unit may calculate the amount of remaining carbonated water based on a discharge time of carbonated water discharged through the dispenser.

The control unit may calculate the amount of remaining carbonated water based on an amount of discharged carbonated water discharged through the dispenser.

The control unit may determine whether to produce carbonated water having the set concentration based on a ratio of remaining carbonated water stored in the carbonated water tank and the present concentration of carbonated water when a command to produce carbonated water is inputted.

The control unit may control the user interface so that the user interface may display that carbonated water production is impossible when the set concentration is smaller than a value obtained by multiplying the ratio of remaining carbonated water by the present concentration.

The control unit may control the user interface so that the user interface may display producing carbonated water having the set concentration when the set concentration is equal to or lager than a value obtained by multiplying the ratio of remaining carbonated water by the present concentration.

In accordance with an aspect of the present disclosure, a control method of a refrigerator includes supplying water to a carbonated water tank, supplying carbon dioxide gas to the carbonated water tank according to a set concentration through a user interface, calculating a present concentration of the carbonated water based on a number of times the carbon dioxide gas is supplied, and displaying the set concentration and the present concentration on the user interface.

The supplying of carbon dioxide gas may include calculating a supply time of carbon dioxide gas based on the present concentration of carbonated water.

The control method may further include displaying an amount of remaining carbonated water stored in the carbonated water on the user interface.

The displaying an amount of remaining carbonated water may include calculating the amount of remaining carbonated water based on a discharge time of carbonated water discharged through the dispenser.

The displaying an amount of remaining carbonated water may include calculating the amount of remaining carbonated water based on an amount of discharged carbonated water discharged through the dispenser.

The control method may further include displaying whether to produce carbonated water having the set concentration based on a ratio of remaining carbonated water stored in the carbonated water tank and the present concentration of carbonated water when a command to produce carbonated water is inputted.

The displaying whether to produce carbonated water having the set concentration may include displaying that carbonated water production is impossible on the user interface when the set concentration is smaller than a value obtained by multiplying the ratio of remaining carbonated water by the present concentration The displaying whether to produce carbonated water having the set concentration may include displaying producing carbonated water having the set concentration on the user interface when the set concentration is equal to or lager than a value obtained by multiplying the ratio of remaining carbonated water by the present concentration.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Figure 1:
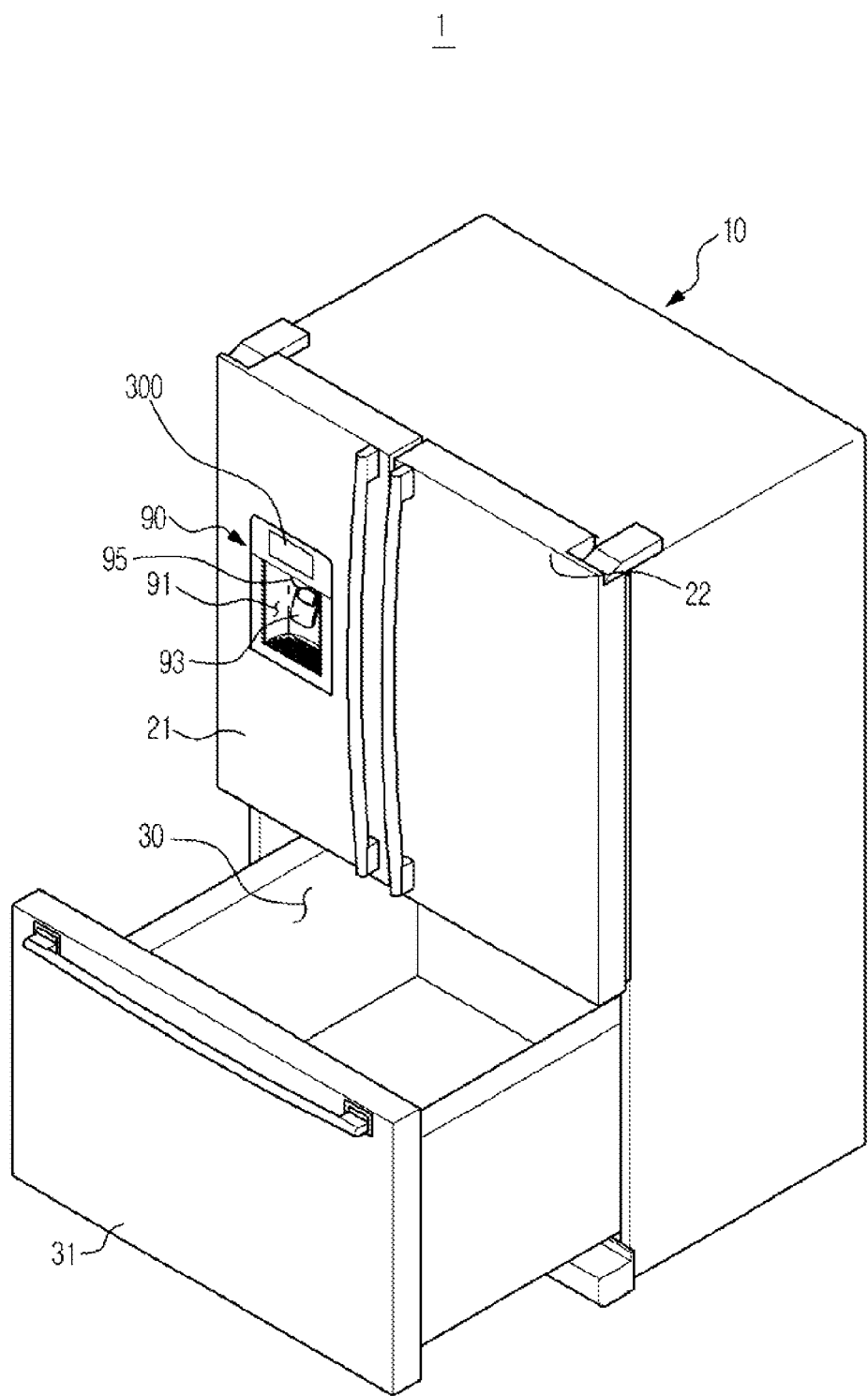
FIG. 1 illustrates a refrigerator according to an embodiment of the present disclosure.

Reference will now be made in detail to embodiments of the present disclosure, examples of which are illustrated in the accompanying drawings, wherein like reference numerals refer to like elements throughout.

Figure 2:
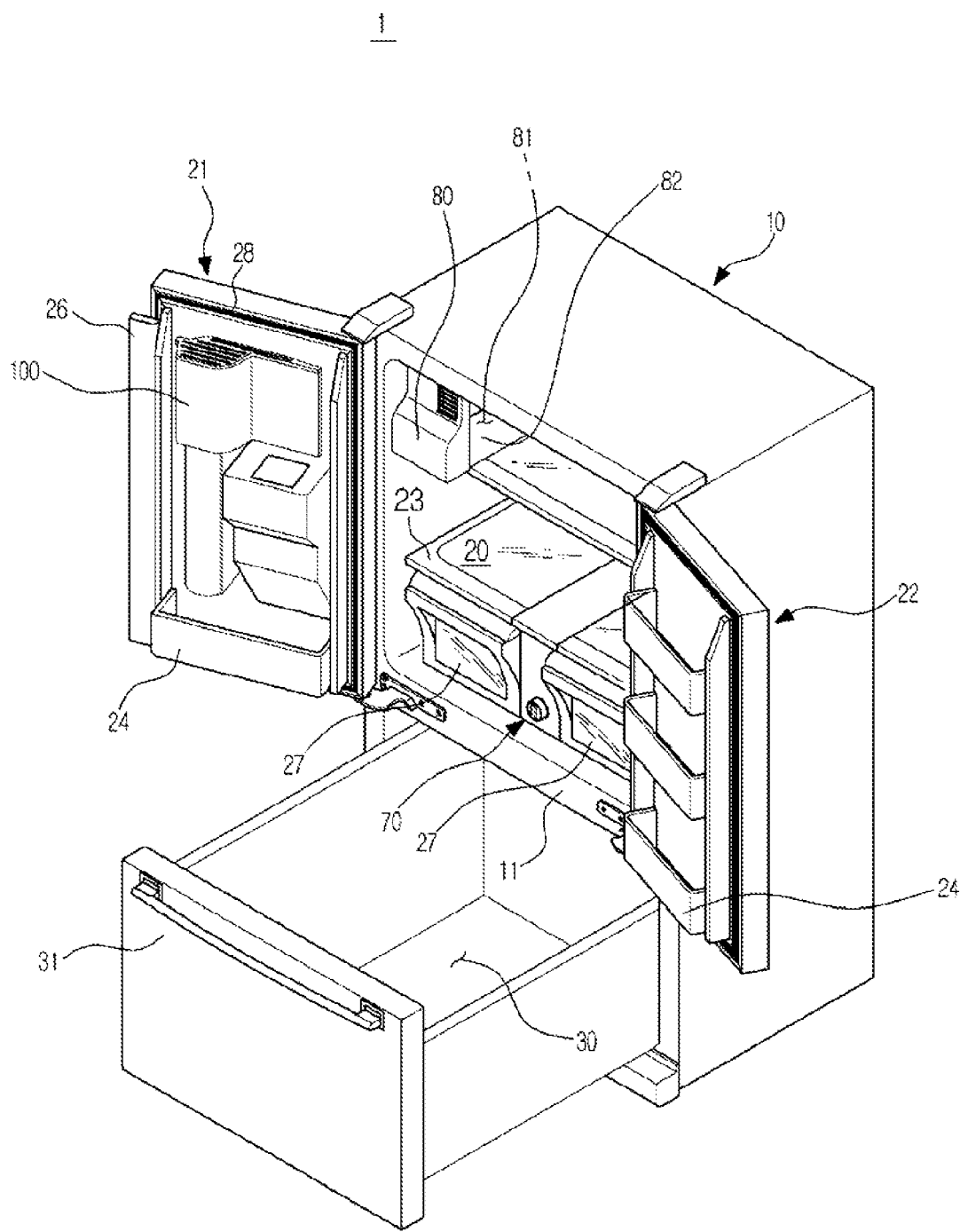
FIG. 2 illustrates an interior of a refrigerator according to an embodiment of the present disclosure.
Figure 3:
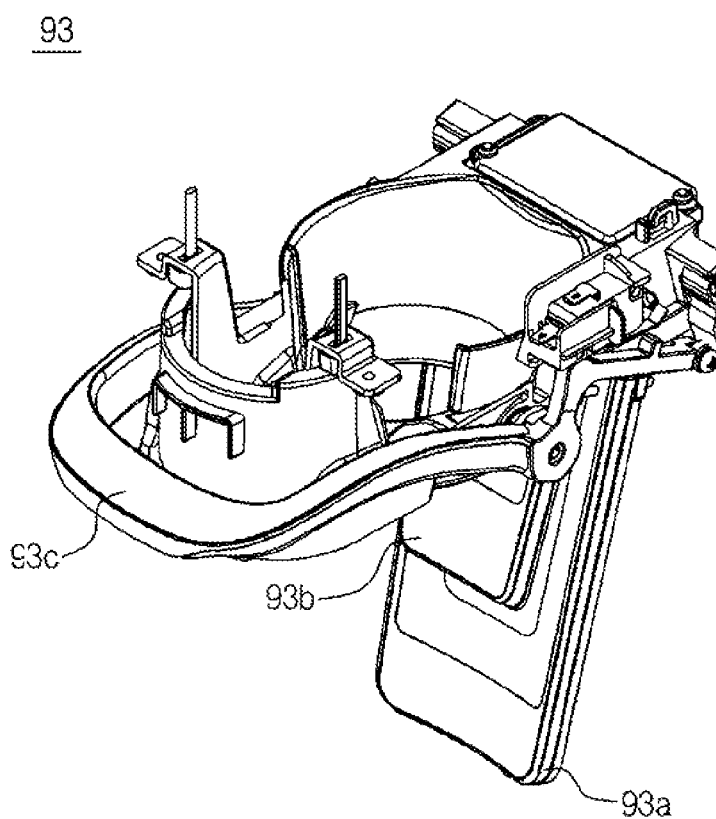
FIG. 3 illustrates a configuration of a dispenser lever of a refrigerator according to an embodiment of the present disclosure.
Figure 4:
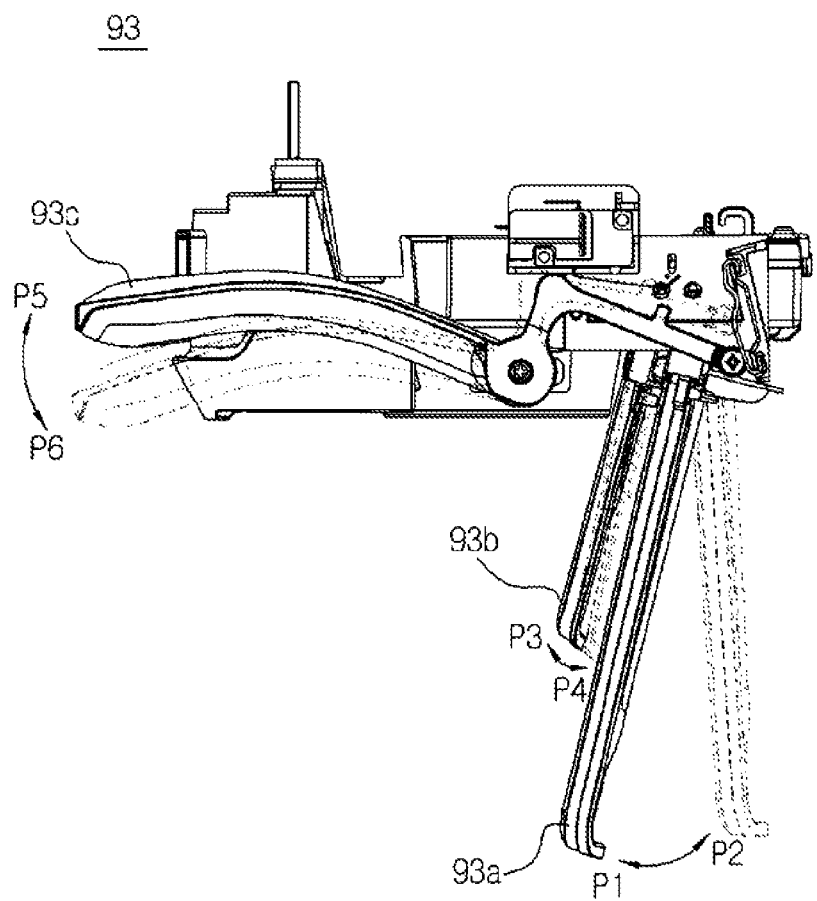
FIG. 4 illustrates a motion of the dispenser lever of a refrigerator according to an embodiment of the present disclosure.

FIG. 1 illustrates a refrigerator according to an embodiment of the present disclosure, and FIG. 2 illustrates an interior of the refrigerator according to an embodiment of the present disclosure. FIG. 3 illustrates a dispenser lever of the refrigerator according to an embodiment of the present disclosure, and FIG. 4 illustrates a dispenser lever of the refrigerator according to an embodiment of the present disclosure.

Referring to FIGS. 1 to 4, a refrigerator 1 according to an embodiment of the present disclosure may include a body 10, a storage chamber 20 and 30 formed inside the body 10, and a cold air supplier (not shown).

The body 10 may include an inner case to form the storage chamber 20 and 30, an outer case coupled to the inner case, for example, at an outside of the inner case to form the appearance of the refrigerator 1, and an insulator disposed, for example, between the inner and outer cases, to insulate the storage chamber 20 and 30.

The storage chamber 20 and 30 may be divided into an upper refrigerating compartment 20 and a lower freezing compartment 30 by an intermediate partition 11. The refrigerating compartment 20 may be kept at a temperature of approximately 3° C., to store food in a refrigerated state, whereas the freezing compartment 30 may be kept at a temperature of approximately −18.5° C., to store food in a frozen state. Racks 23 may be provided at the refrigerating compartment 20, to place food thereon. In the refrigerating compartment 20, at least one storage box 27 may be provided to store food, for example, in a closed state.

An ice making compartment 81 to produce ice may be provided, for example, at an upper corner of the refrigerating compartment 20. The ice making compartment 81 may be separated from the refrigerating compartment 20 by an ice making compartment case 82. In the ice making compartment 81, an icemaker 80 may be provided. The icemaker 80 may include an ice making tray to produce ice, and may include an ice bucket to store ice produced in the ice making tray.

A tank, e.g., water tank 70 capable of storing a liquid, e.g., water may be provided at the refrigerating compartment 20. When a plurality of storage boxes 27 is provided, the water tank 70 may be disposed between adjacent ones of the storage boxes 27, as illustrated in FIG. 2. Embodiments of the present disclosure are not limited to thereto. The water tank 70 may be disposed at various positions, and, for example, disposed within the refrigerating compartment 20 in order to cool water stored in the water tank 70 by cold air in the refrigerating compartment 20.

Figure 5:
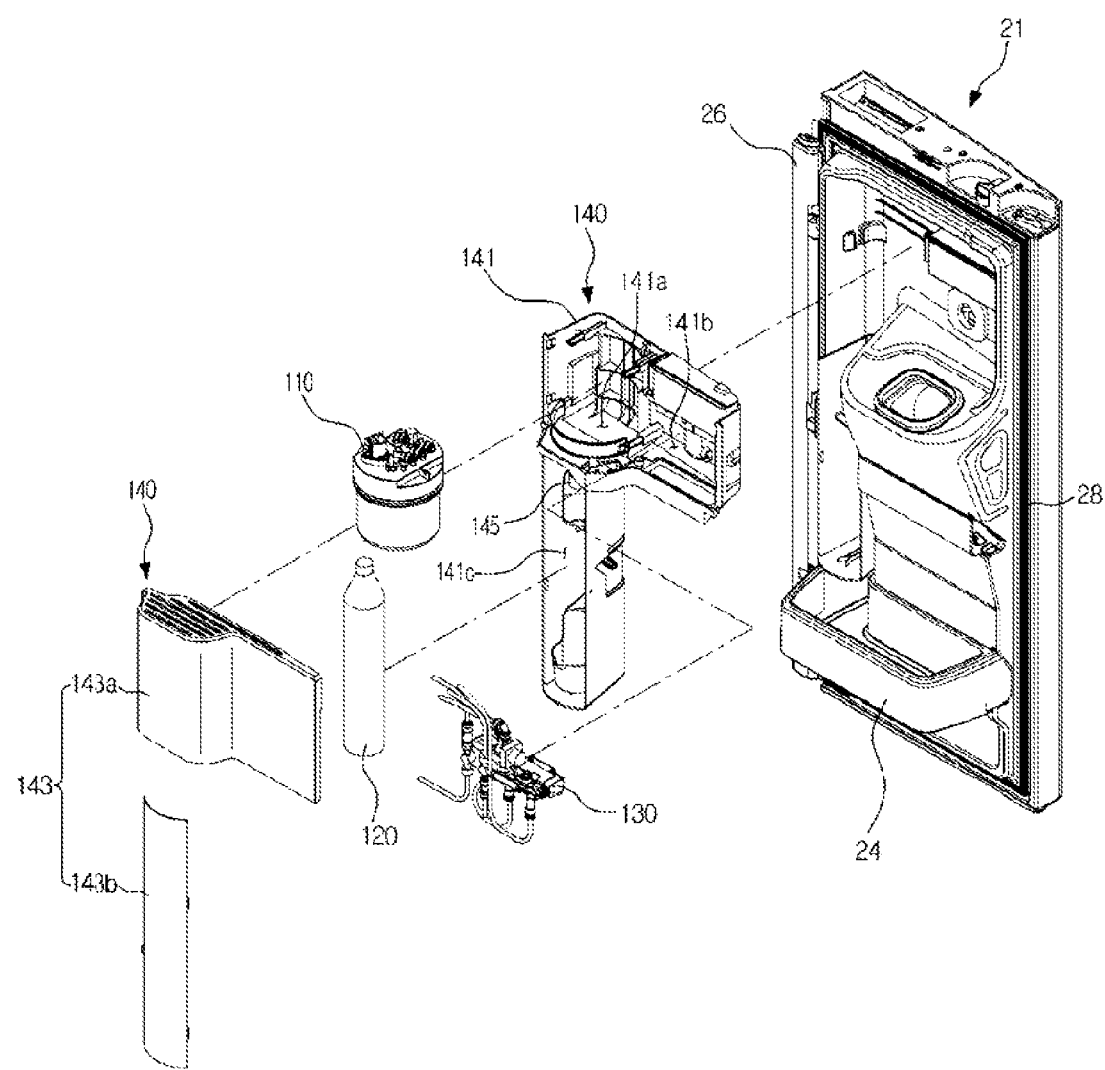
FIG. 5 illustrates a carbonated water production module of a refrigerator according to an embodiment of the present disclosure.

The water tank 70 may be connected to an external water supply source 40 (see, for example, FIG. 5) and may store purified water purified by a purification filter 50 (see, for example, FIG. 5). A flow path switching valve 60 (see, for example, FIG. 5) may be provided at a water supply pipe configured to connect the water tank 70 to the external water supply source 40. Through the flow path switching valve 60, water may be supplied to the icemaker 80.

Each of the refrigerating compartment 20 and freezing compartment 30 may have an open front side to allow food to be place therein or withdraw therefrom. The open front side of the refrigerating compartment 20 may be opened/closed by a pair of rotatable doors 21 and 22 hinge-coupled to the body 10. The open front side of the freezing compartment 30 may be opened/closed by a sliding door 31 slidable with respect to the body 10. Door guards 24 may be provided at rear surfaces of the refrigerating compartment doors 21 and 22 to store food.

A gasket 28 may be provided along an edge of the rear surface of the refrigerating compartment door 21 and 22 to confine cold air in the refrigerating compartment 20 by closing between the refrigerating compartment door 21 and 22 and the body 10 when the refrigerating compartment door 21 and 22 are closed. A rotating bar 26 may be selectively provided at one of the refrigerating compartment doors 21 and 22, to confine cold air in the refrigerating compartment 20 by closing between the refrigerating compartment door 21 and 22 when the refrigerating compartment door 21 and 22 are closed.

A dispenser 90 may be provided at one of the refrigerating compartment doors 21 and 22, for example, the refrigerating compartment door 21, to allow the user to put out purified water, carbonated water or ice from the outside of the refrigerator 1 without opening the refrigerating compartment door 21.

The dispenser 90 may include a dispensation space 91 in which a container such as a cup, may be inserted to dispense water or ice, a dispenser lever 93 configured to operate the dispenser 90 to discharge purified water, carbonated water or ice, and a dispenser nozzle 95 in which purified water or carbonated water may be discharged.

The dispenser lever 93 may include a first lever 93a, a second lever 93b, and a third lever 93c.

The first lever 93 may be formed to be extended from an upper side to an lower side, and may be rotatably moved back and forth with respect to a first shaft (not shown) provided on an upper side of the first lever 93a.

The first lever 93a may be rotatably moved between a first position P1 and a second position P2 with respect to the first shaft (not shown). For example, when the user may press the first lever 93a backward, the first lever 93a may be moved from the first position P1 to the second position P2. When the user may stop pressing the first lever 93a, the first lever 93a may automatically return to the first position P1.

The second lever 93b may be provided to be placed on the first lever 93a, and may be rotatably moved back and forth with respect to a second shaft (not shown) provided on an upper side of the second lever 93b.

The second lever 93b may be rotatably moved between a third position P3 and a fourth position P4 with respect to the second shaft (not shown). For example, when the user may press the second lever 93b backward, the second lever 93b may be moved from the third position P3 to the fourth position P4. When the user may stop pressing the second lever 93b, the second lever 93b may automatically return to the third position P3.

The third lever 93c may be protruded toward the front of the dispenser 90, and may be rotatably moved up and down with respect to a third shaft (not shown) provided on a rear side of the third lever 93c.

The third lever 93c may be rotatably moved between a fifth position P5 and a sixth position P6 with respect to the third shaft (not shown). For example, when the user may press the third lever 93c downward, the third lever 93c may be moved from the fifth position P5 to the sixth position P6 and fixed at the sixth position P6. When the user may press the third lever 93c upward, the third lever 93c may be moved from the sixth position P6 to the fifth position P5 and fixed at the fifth position P5.

The user may input commands to discharge ice, purified water, or carbonated water by manipulating the first lever 93a, the second lever 93b, or the third lever 93c.

For example, when the user presses the second lever 93b, the refrigerator 1 may discharge ice. That is, when the second lever 93 is placed at the fourth position P4, the refrigerator 1 may be capable to discharge ice through the dispenser 90.

For example, when the user places the third lever 93c at the fifth position P5 and presses the first lever 93a, the refrigerator 1 may discharge purified water. When the user places the third lever 93c at the sixth position P6 and presses the first lever 93a, the refrigerator 1 may discharge carbonated water. That is, when the first lever 93a is placed at the second position P2, the refrigerator 1 may discharge purified water or carbonated water depending on the position of the third lever 93c.

The user interface 300 may receive a control command of the refrigerator 1 from the user, and may display an operation information of the refrigerator 1 to the user.

A carbonated water production module 100 configured to produce carbonated water may be mounted to the rear surface of the refrigerating compartment door 21 where the dispenser 90 of the refrigerator 1 is provided.

Figure 6:
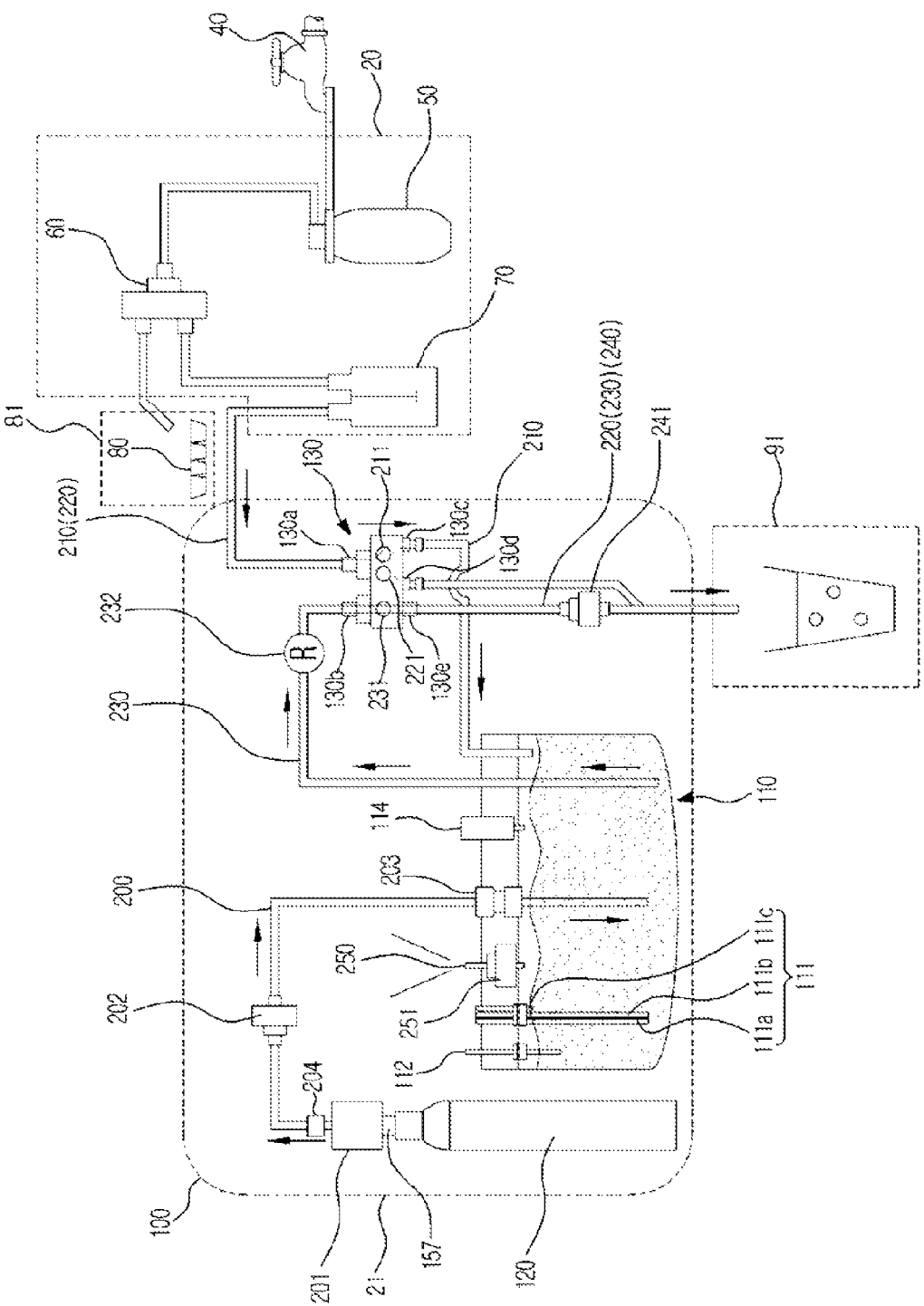
FIG. 6 illustrates a configuration of a carbonated wager production module of a refrigerator according to an embodiment of the present disclosure.

FIG. 5 is a view illustrating a carbonated water production module of a refrigerator according to an embodiment of the present disclosure and FIG. 6 is a view illustrating a configuration of a carbonated wager production module of a refrigerator according to an embodiment of the present disclosure.

The carbonated water production module 100 may produce carbonated water within the refrigerator 1. The carbonated water production module 100 may include a carbonated water tank 110 producing carbonated water by mixing of purified water with carbon dioxide gas and storing the carbonated water, a carbon dioxide gas cylinder 120 storing high-pressure carbon dioxide gas, a valve assembly 130 controlling a flow of purified water and carbonated water, and a module case 140 provide with accommodation spaces 141a, 141b, 141c in which the carbon dioxide gas cylinder 120 and the carbonated water tank 130, and coupled to the rear surface of the refrigerating compartment door 21.

Carbon dioxide gas at a pressure, for example, a high pressure of approximately 45 to 60 bars, may be stored in the carbon dioxide gas cylinder 120. The carbon dioxide gas cylinder 120 may be placed in the lower accommodation space 141c, for example, while being mounted to a cylinder connector 145 of the module case 140.

Carbon dioxide gas in the carbon dioxide gas cylinder 120 may be supplied to the carbonated water tank 110 through a carbon dioxide gas supply flow path 200 that interconnects the carbon dioxide gas cylinder 120 and the carbonated water tank 110.

The carbon dioxide gas supply flow path 200 may be provided with a carbon dioxide gas regulator 201 to adjust the pressure of carbon dioxide gas, a carbon dioxide gas pressure sensor 204 to detect a pressure of discharged carbon dioxide gas, a carbon dioxide gas supply valve 202 to open/close the carbon dioxide gas supply flow path 200, and a carbon dioxide gas backflow prevention valve 203 to prevent backflow of carbon dioxide gas.

The carbon dioxide gas regulator 201 may be provided on a carbon dioxide outlet of the carbon dioxide gas cylinder 120 to adjust the pressure of carbon dioxide gas discharged from the carbon dioxide gas cylinder 120. The carbon dioxide gas regulator 201 may reduce the pressure of carbon dioxide gas to approximately 8.5 bars.

The carbon dioxide pressure sensor 204 may be provided on a carbon dioxide outlet of the carbon dioxide regulator 201 and may detect the pressure of carbon dioxide gas reduced by the carbon dioxide gas regulator 201.

When the pressure of carbon dioxide gas reduced by the carbon dioxide gas regulator 201 is reduced under a predetermined pressure, the carbon dioxide pressure sensor 204 may employ a pressure switch configured to output signals corresponding to the reduced pressure of carbon dioxide gas.

The carbonated water tank 110 may produce carbonated water by mixing of purified water supplied from the water tank 70 with carbon dioxide gas supplied from the carbon dioxide gas cylinder 120 and store the carbonated water. According to an exemplary embodiment a liquid other than water may be carbonated.

A purified water supply flow path 210 receiving purified water from the water tank 70 may be connected to the carbonated water tank 110. A carbonated water discharge flow path 230 discharging the produced carbonated water to the dispenser nozzle 95, and a carbon dioxide gas discharge flow path 250 discharging carbon dioxide gas remaining in the carbonated water tank 110, for supply of purified water to the carbonated water tank 110, may be connected to the carbonated water tank 110.

A purified water supply valve 211 opening/closing the purified water supply flow path 210 may be provided at the purified water supply flow path 210.

The carbonated water discharge flow path 230 may be provided with a carbonated water discharge valve 231 to open or close the carbonated water discharge flow path 230, and a carbonated water regulator 232 to adjust the pressure of carbonated water discharged through the carbonated water discharge flow path 230. A carbon dioxide gas discharge valve 251 opening/closing the carbon dioxide gas discharge flow path 250 may be provided at the carbon dioxide gas discharge flow path 250. Each of the purified water supply valve 211 and carbonated water discharge valve 231 may be a solenoid valve.

The carbonated water tank 110 may be provided with a water level sensor 111 to measure the amount of purified water supplied to the carbonated water tank 110.

The water level sensor 111 may include a first electrode 111a and a second electrode 111b, both of which have the same length, and a third electrode 111c having different length from the first electrode 111a and the second electrode 111b.

For example, each end of the first electrode 111a and the second electrode 111b may be disposed at a height corresponding to the lowest carbonated water level, and an end of the third electrode 111c may be disposed at a height corresponding to the highest carbonated water level. When the current is conducted between any one electrode between the first electrode 111a and the second electrode 111b, and the third electrode 111c, the refrigerator 1 may determine that the carbonated water level is higher than the highest carbonated water level. When the current is not conducted between the first electrode 111a and the second electrode 111b, the refrigerator 1 may determine that the carbonated water level is less than the lowest carbonated water level.

The water level sensor 111 may include three electrodes 111a, 111b, 111c, and may determine whether the carbonated water level is the highest level and whether the carbonated water level is the lowest level, wherein the carbonated water is stored in the carbonated water tank 110.

However, the water level sensor 111 is not limited thereto. For example, the water level sensor 111 may include two electrodes and may determine whether the carbonated water level is the highest level or the lowest level. For example, the water level sensor 111 may include four or more electrodes and may detect more than three point of the water level according to the number of electrodes.

Hereinafter, to illustrate an exemplary example, it may be assumed that the water level sensor 111 may include three electrodes 111a, 111b, 111c, and may detect whether the carbonated water level is the highest level and whether the carbonated water level is the lowest level.

A relief valve 141 may be provided at the carbonated water tank 110. When carbon dioxide gas of a high pressure exceeding a predetermined pressure is supplied to the carbonated water tank 110 due to malfunction of the carbon dioxide gas regulator 201, etc, the relief valve 141 may discharge the carbon dioxide gas of the excessively high pressure.

The carbonated water tank 110 may be formed to have a predetermined size to store, for example, approximately one liter of carbonated water. The carbonated water tank 110 may be made of a stainless steel material to minimize the size of the carbonated water tank 110 while sustaining a high pressure and exhibiting corrosion resistance.

The carbonated water tank 110 may be placed in the first upper accommodation space 141a of the module case 140.

A purified water discharge flow path 220 may be provided to discharge purified water stored in the water tank 70 into the dispensation space 91. A purified water discharge valve 221 opening/closing the 220 may be provided at the purified water discharge flow path 220. The purified water discharge valve 221, purified water supply valve 211, and carbonated water discharge valve 231 may each be a solenoid valve.

The purified water supply valve 211, the carbonated water discharge valve 231 and the purified water discharge valve 221 may form a valve assembly 130. That is, the purified water supply valve 211, carbonated water discharge valve 231, and purified water discharge valve 221 may be integrally formed.

The valve assembly 130 may include a first inlet port 130a connected to the water tank 70, and a second inlet port 130b connected to the carbonated water tank 110. The valve assembly 130 may include a first outlet port 130c connected to the carbonated water tank 110, a second outlet port 130d connected to the dispenser nozzle 95, and a third outlet port 130e connected to the dispenser nozzle 95. The purified water supply flow path 210 and the purified water discharge flow path 220 may pass through the first inlet port 130a. The carbonated water discharge flow path 230 may pass through the second inlet port 130b. The purified water supply flow path 210 may pass through the first outlet port 130c. The purified water discharge flow path 220 may pass through the second outlet port 130d. The carbonated water discharge flow path 230 may pass through the third outlet port 130e.

The purified water supply valve 211, the purified water discharge valve 221, and the carbonated water discharge valve 231 may be independently opened or closed.

Although the valve assembly 130 may be the three independent valves 211, 221, and 231, the valve assembly may be a one three-way flow path switch valve to selectively supply purified water from the water tank 70 to the carbonated water tank 110 or the dispensation space 91, and another three-way flow path switch valve to supply purified water from the water tank 70 to the dispensation space 91 or to supply carbonated water from the carbonated water tank 110 to the dispensation space 91.

The valve assembly 130 may be placed in the second upper accommodation space 141b of the module case 140.

The purified water discharge flow path 220 directly discharging purified water from the water tank 70 into the dispensation space 91 and the carbonated water discharge flow path 230 discharging carbonated water from the carbonated water tank 110 into the dispensation space 91 may be joined, for example, at a certain point and to form a common discharge flow path 240.

The purified water discharge flow path 220 and the carbonated water discharge flow path 230 may be joined at the outside of the valve assembly 130. Accordingly, the purified water discharge flow path 220 and the carbonated water discharge flow path 230 may be unified to be provided in the dispenser nozzle 95 in the form of a single flow path without separation. The purified water discharge flow path 220 and the carbonated water discharge flow path 230 may separately extend to the dispenser nozzle 95 without being unified.

A remaining water discharge prevention valve 241 may be provided at the common discharge flow path 240. The remaining water discharge prevention valve 241 may open/close the common discharge flow path 240 to prevent purified water or carbonated water remaining in the common discharge flow path 240 from being discharged into the dispensation space 91 in a state in which the purified water discharge valve 221 and carbonated water discharge valve 231 are closed. The remaining water discharge prevention valve 241 may be disposed at an end of the common discharge flow path 240.

The module case 140 may include a back case 141 opened at one side thereof, and a cover 143 coupled to the open side of the back case 141.

In a state in which the cover 143 may be coupled to the back case 141, the carbon dioxide gas cylinder 120, the carbonated water tank 110, and the valve assembly 130 placed in the module case 140 may be prevented from being exposed to the outside.

The cover 143 may be divided into a first cover 143*a* to open or close the upper accommodation spaces 141*a* and 141*b*, in which the carbonated water tank 110 and the valve assembly 130 are placed, respectively, and a second cover 143*b* to open or close the lower accommodation space 141*c*, in which the carbon dioxide gas cylinder 120 is placed. The first cover 143*a* and second cover 143*b* may be independently opened or closed.

When the carbon dioxide gas cylinder 120 is replaced with a new one due to exhaustion of carbon dioxide gas thereof, the replacement may be achieved by separating only the second cover 143*b* without opening the first cover 143*a*. Thus, it may be possible to prevent cold air in the upper accommodation space 141*a* from being outwardly discharged during the replacement of the carbon dioxide gas cylinder 120 because the first cover 143*a* is maintained in a closed state.

Figure 7:
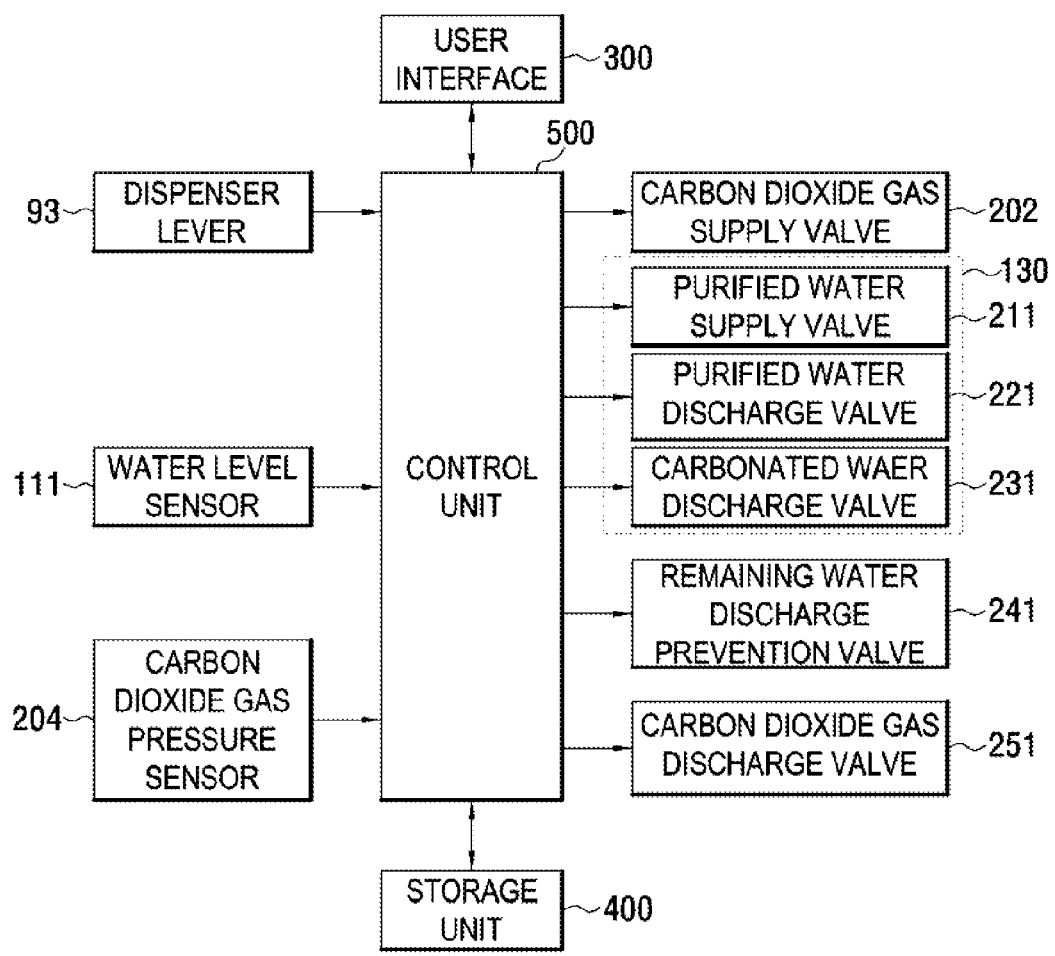
FIG. 7 is a block diagram of a refrigerator according to an embodiment of the present disclosure.
Figure 8:
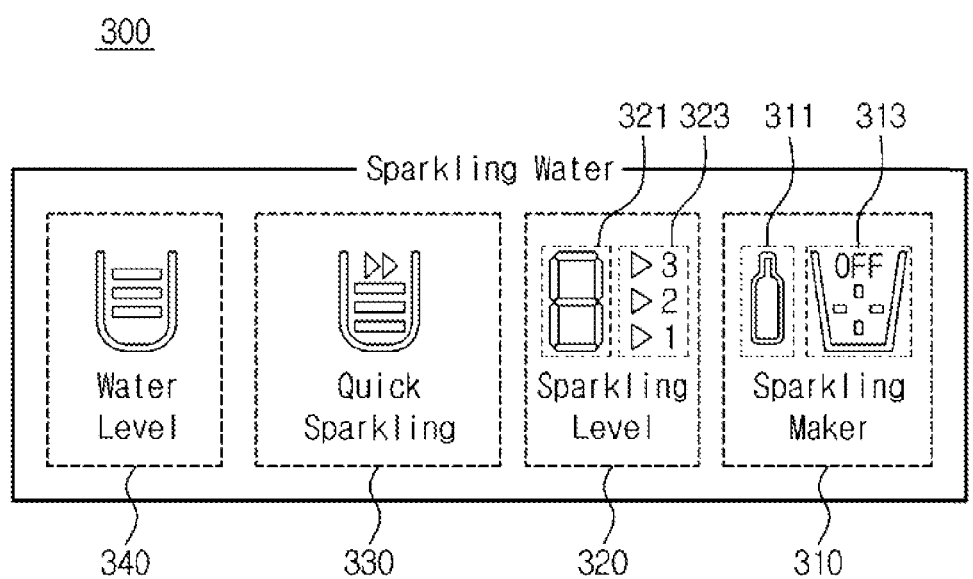
FIG. 8 illustrates a user interface of a refrigerator according to an embodiment of the present disclosure.

FIG. 7 is a block diagram of a refrigerator according to an embodiment of the present disclosure and FIG. 8 is a view illustrating a user interface of a refrigerator according to an embodiment of the present disclosure.

Referring to FIGS. 7 and 8, the refrigerator 1 may include a cool air supplier (not shown), the carbonated water production module 100, a user interface 300 interacting with a user, a storage unit 400 storing programs and data related to an operation of the refrigerator 1, and a control unit 500 controlling the operation of the refrigerator 1.

The user interface 300 may include a carbonated water producing activation unit 310 displaying information related to producing a carbonated water by receiving a command to produce carbonated water from the user, and a carbonated water concentration setting unit 320 displaying information related to setting a concentration of a carbonated water by receiving a command of setting a concentration of a carbonated water from the user. The user interface 300 may include a carbonated water high-speed producing unit 330 displaying information related to producing a carbonated water at high-speed by receiving a command to produce a carbonated water at high-speed from the user, and a carbonated water level displaying unit 340 displaying a carbonated water level.

Each unit 310, 320, 330, 340 provided in the user interface 300 may include a touch detecting unit detecting a touch or a pressure by the user and a display unit displaying images to the user.

The touch detecting unit may employ a micro switch and a membrane switch to detect a pressure of the user or a touch pad detecting a touch of the user. The display unit may employ Liquid Crystal Display (LCD), Light Emitting Diode (LED), or Organic Light Emitting Diode (OLED).

Each unit 310, 320, 330, 340 provided in the user interface 300 may employ a touch screen. The touch screen may be integrally formed with the touch detecting unit and the display unit to display information of operation corresponding to a control command by receiving a control command through a touch of the user.

The carbonated water producing activation unit 310 may receive a command to produce carbonated water from the user. The carbonated water producing activation unit 310 may include a carbon dioxide gas low-pressure display unit 311 warning that a pressure of carbon dioxide gas discharged from the carbon dioxide gas cylinder 120 is less than a predetermined pressure and a carbonated water producing display unit 313 displaying producing carbonated water at real time.

For example, when a carbon dioxide gas pressure of carbon dioxide gas discharged from the carbon dioxide gas cylinder 120 is less than the predetermined pressure, the refrigerator 1 may warn low-pressure of carbon dioxide gas by emitting the carbon dioxide gas low-pressure display unit 311. When producing carbonated water, the refrigerator 1 may display carbonated water production by emitting the carbonated water producing display unit 313.

When the user touches or presses the carbonated water producing activation unit 310, the refrigerator 1 may start to produce carbonated water and may emit the carbonated water producing display unit 313.

The carbonated water concentration setting unit 320 may receive a command of setting a concentration of a carbonated water from the user. The carbonated water concentration setting unit 320 may include a present concentration display unit 321 displaying a concentration of carbonated water stored in the carbonated water tank 110 and a setting concentration display unit 323 displaying a set concentration of carbonated water which is set by the user.

For example, the present concentration display unit 321 may display a present concentration of carbonated water stored in the carbonated water tank 110, for example, in 7-segment displays, and the setting concentration display unit 323 may display a set concentration of carbonated water inputted by the user.

When the user touches or presses the carbonated water concentration setting unit 320, the refrigerator 1 may change a target concentration of carbonated water and may change a set concentration of carbonated water displayed on the setting concentration display unit 323.

The carbonated water high-speed producing unit 330 may receive a command to produce a carbonated water at high-speed from the user and may display an operation of a carbonated water high-speed production according to the command to produce a carbonated water at high-speed.

For example, when the user touches or presses the carbonated water high-speed producing unit 330, the refrigerator 1 may produce carbonated water at a high-speed according to a predetermined method, and may emit the carbonated water high-speed producing unit 330.

The carbonated water level displaying unit 340 may display a water level of remaining carbonated water stored in the carbonated water tank 110.

For example, the water level of carbonated water stored in the carbonated water tank 110 may be classified by three levels between the highest level and the lowest level. The carbonated water level displaying unit 340 may include three emitting bars 341 configured to emit according to the carbonated water level. For example, when a carbonated water level of carbonated water stored in the carbonated water tank 110 is the highest level, three emitting bars 341 provided in the carbonated water level displaying unit 340 may be ON, and when a carbonated water level is the lowest level, three emitting bars 341 may be OFF.

The storage unit 400 may store programs and data related to cooling operation of the refrigerator 1 and programs and data related to carbonated water production. For example, the storage unit 400 may store a target temperature of the refrigerating compartment 20, a target temperature of the freezing compartment 30, etc. related to the cooling operation, and a carbonated water level, a present concentration of carbonated water, a set concentration of carbonated water, etc. related to carbonated water production.

The storage unit 400 may employ a nonvolatile memory, such as, magnetic disc, solid state disk, etc. to store permanently programs and data to control the operation of the refrigerator 1, and a volatile memory, such as, D-RAM, S-RAM to temporarily store data generated during the operation of the refrigerator 1.

The control unit 500 may control overall operation of the refrigerator 1.

The control unit 500 may control the carbonated water production module 100 so that carbonated water may be produced according to a set concentration, a carbonated water level, wherein the carbonated water is stored in the carbonated water tank 110, and carbonated water may be discharged according to a command discharging carbonated water through the dispenser lever 93.

The control unit 500 may include one or more microprocessors operating calculation depending on programs and data stored in the storage unit 400.

Hereinafter, an operation of the refrigerator 1, producing carbonated water and discharging carbonated water is disclosed.

Figure 9:
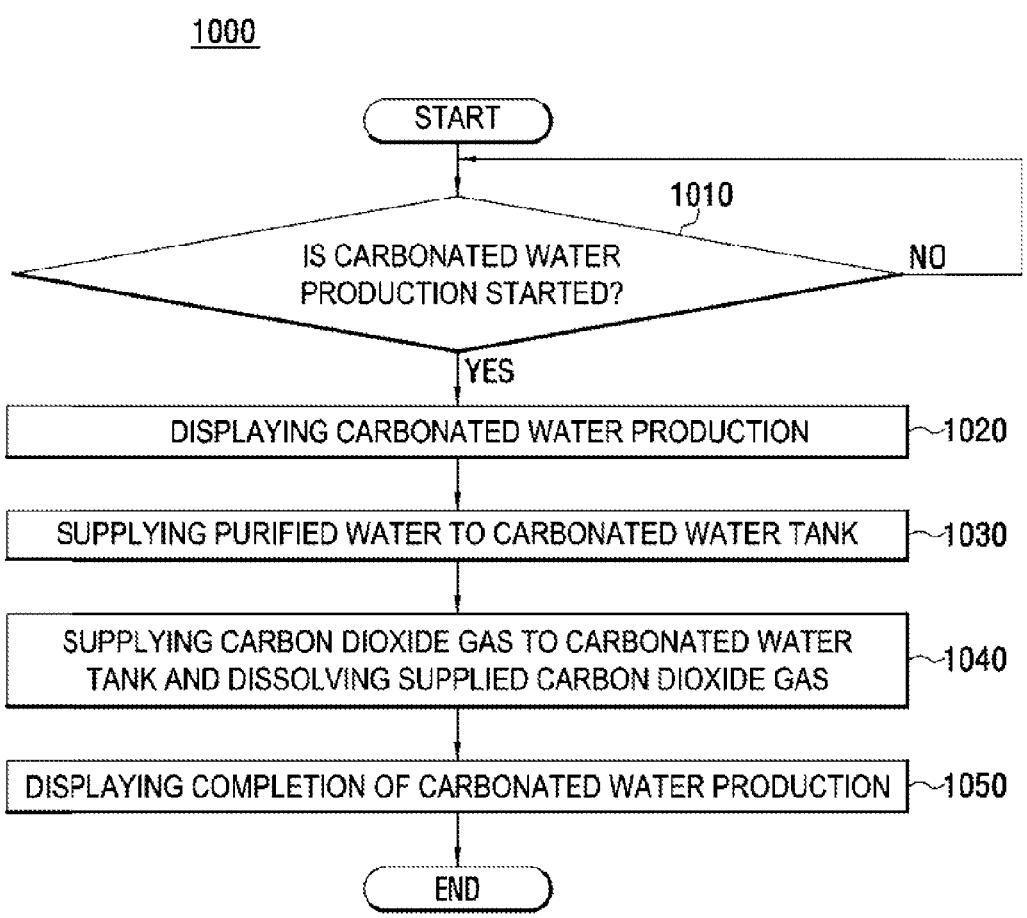
FIG. 9 is a flow chart illustrating a carbonated water production method according to an embodiment of the present disclosure.
Figure 10:
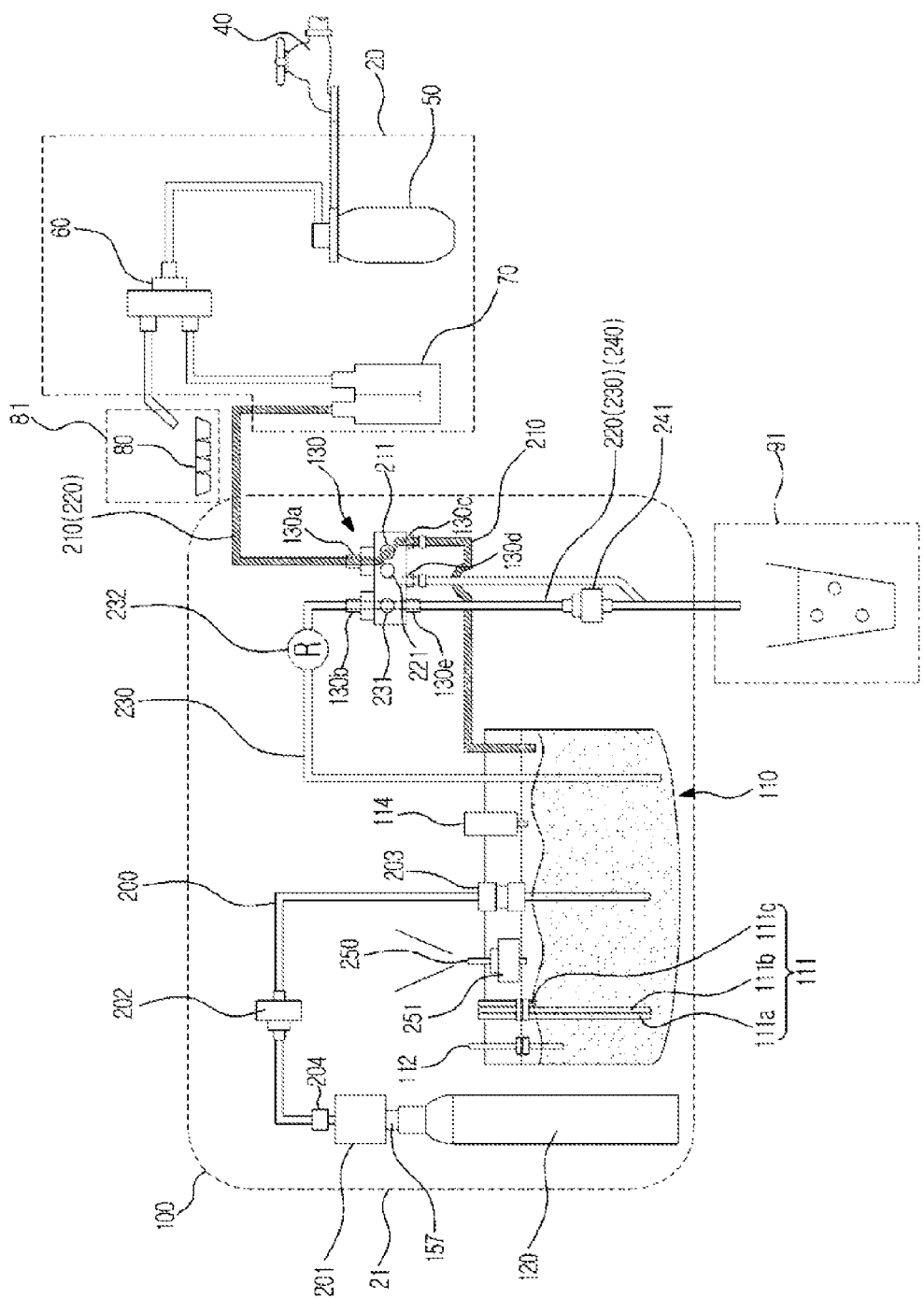
FIGS. 10 and 11 illustrate an exemplary carbonated water production method.
Figure 11:
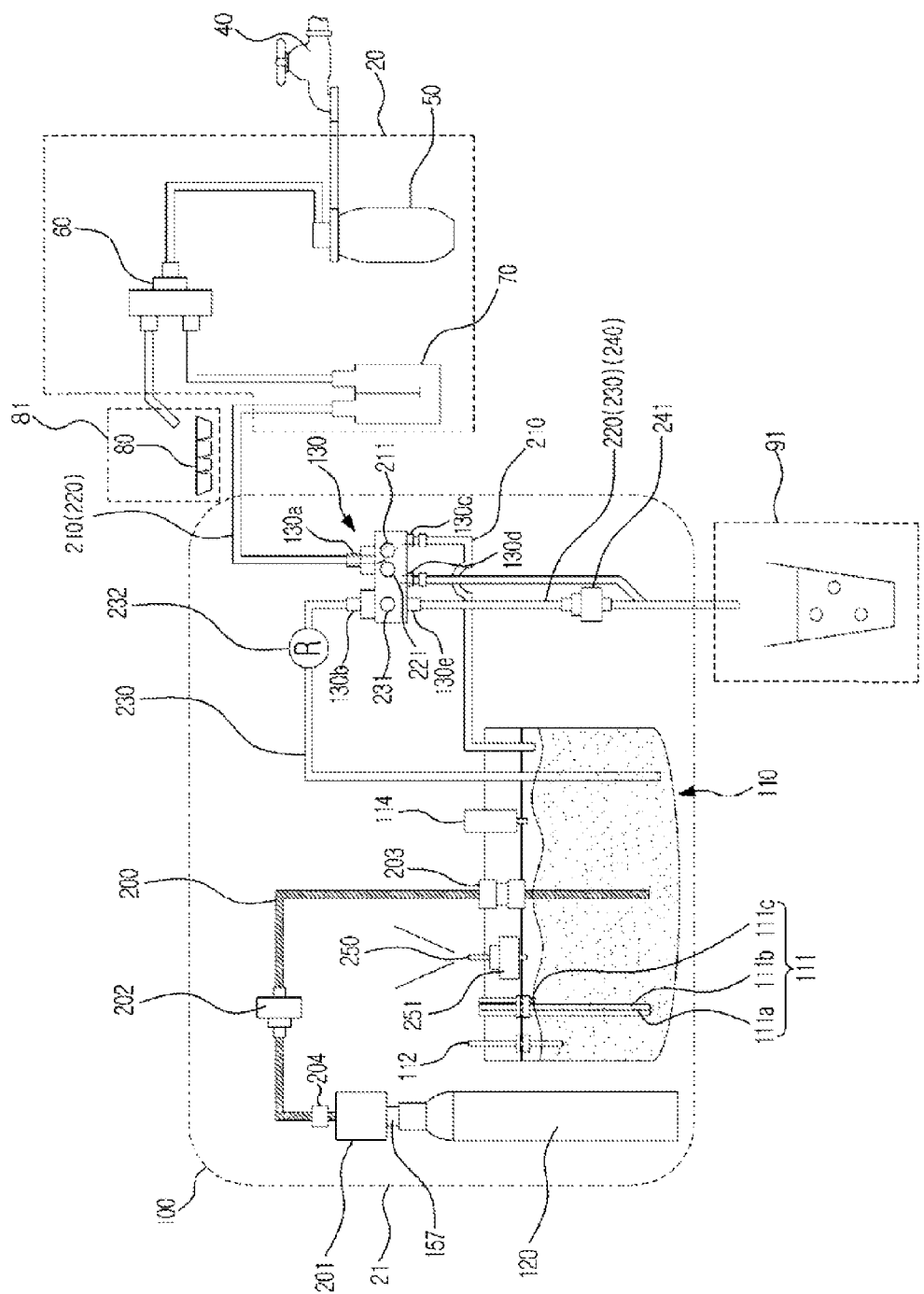

FIG. 9 is a flow chart illustrating a carbonated water production method according to an embodiment of the present disclosure and FIGS. 10 and 11 are views illustrating an exemplary carbonated water production method.

Referring to FIGS. 9 to 11, an exemplary carbonated water production method 1000 is described.

The refrigerator 1 may determine whether conditions for starting to produce carbonated water are satisfied (1010). The term of "conditions for starting to produce carbonated water" may represent conditions to allow the refrigerator 1 to start to produce carbonated water. For example, when a carbonated water level of carbonated water stored in the carbonated water tank 110 is less than the lowest level, the refrigerator 1 may automatically start to produce carbonated water. When the user inputs a command of carbonated water production activation through the user interface 300, the refrigerator 1 may start to produce carbonated water.

When the condition for starting to produce carbonated water is determined (YES of 1010), the refrigerator 1 may display carbonated water production on the user interface 300 (1020). For example, the refrigerator 1 may emit the carbonated water producing display unit 313 provided in the carbonated water producing activation unit 310 (see, for example, FIG. 8).

The refrigerator 1 may supply purified water to the carbonated water tank 110 (1030).

The refrigerator 1 may open the purified water supply valve 211 to supply purified water to the carbonated water tank 110. The refrigerator 1 may open the carbon dioxide gas discharge valve 251 to smoothly supply purified water to the carbonated water tank 110. Therefore, purified water may be prevented from not being supplied to the carbonated water tank 110 when an internal pressure of the carbonated water tank 110 is higher than a supply pressure of purified water due to carbon dioxide gas in the carbonated water tank 110.

When the purified water supply valve 211 is opened, purified water may be supplied from the water tank 70 to the carbonated water tank 110 along the purified water supply flow path 210, as illustrated in FIG. 10.

When a purified water level of purified water stored in the carbonated water tank 110 is higher than the highest level, the refrigerator 1 may close the purified water supply valve 211 and the carbon dioxide gas discharge valve 251.

The refrigerator 1 may determine whether the purified water level of purified water stored in the carbonated water tank 110 is higher than the highest level by the water level sensor 111. For example, when the current is conducted between any one electrode between the first electrode 111*a* and the second electrode 111*b*, and the third electrode 111*c*, the refrigerator 1 may determine that the carbonated water level is higher than the highest level.

The refrigerator 1 may supply carbon dioxide gas to the carbonated water tank 110 and may dissolve the carbon dioxide gas (1040).

The refrigerator 1 may open the carbon dioxide gas supply valve 202 during a predetermined supply time to supply carbon dioxide gas to the carbonated water tank 110 and then the refrigerator 1 may stand by during a predetermined dissolve time to dissolve carbon dioxide gas in purified water.

When the carbon dioxide gas supply valve 202 is opened, carbon dioxide gas may be supplied from the carbon dioxide gas cylinder 120 to the carbonated water tank 110 through carbon dioxide gas supply flow path, as illustrated in FIG. 11. A carbon dioxide gas pressure of the inside of the carbonated water tank 110 may be limited to be less than a certain pressure so that the refrigerator 1 may repeatedly supply carbon dioxide gas and dissolve carbon dioxide gas to dissolve a large amount of carbon dioxide gas in purified water.

The number of times carbon dioxide gas is supplied and a supplying time of carbon dioxide gas may be changed according to a set concentration inputted by the user. That is, the refrigerator 1 may change an amount of carbon dioxide gas dissolved in purified water by changing the number of times carbon dioxide gas is supplied and a supply time of the carbon dioxide gas.

For example, when a set concentration is set to level 1, supplying carbon dioxide gas and dissolving supplied carbon dioxide gas may be performed once, respectively. When a set concentration is set to level 2, supplying carbon dioxide gas and dissolving supplied carbon dioxide gas may be performed two times, respectively. When a set concentration is set to level 3, supplying carbon dioxide gas and dissolving supplied carbon dioxide gas may be performed three times, respectively.

Carbon dioxide gas having a certain pressure may be supplied to the carbonated water tank 110 through the carbon dioxide gas regulator 201. Therefore, the refrigerator 1 may estimate an amount of supplied carbon dioxide gas based on a period of time the carbon dioxide gas supply valve 202 is open (a supply time of carbon dioxide gas) and an output pressure of the carbon dioxide gas regulator 201.

When supplying purified water and supplying carbon dioxide gas and dissolving carbon dioxide gas are completed, the refrigerator 1 may display a completion of carbonated water production though the user interface 300 (1050).

For example, the refrigerator 1 may not allow the carbonated water producing display unit 313 provided in the carbonated water producing activation unit 310 (see, for example, FIG. 8) to be emitted.

Figure 12:
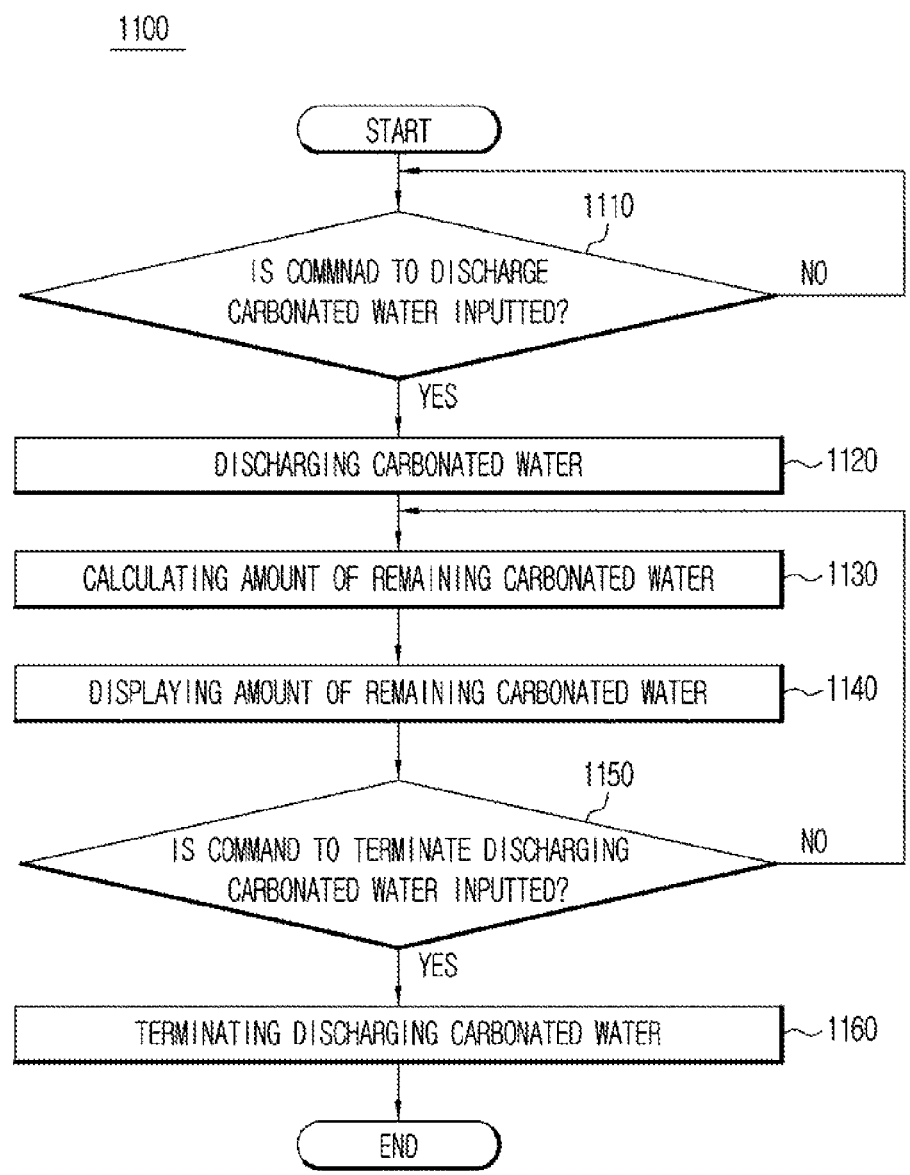
FIG. 12 is a view illustrating a carbonated water discharging method according to an embodiment of the present disclosure.
Figure 13:
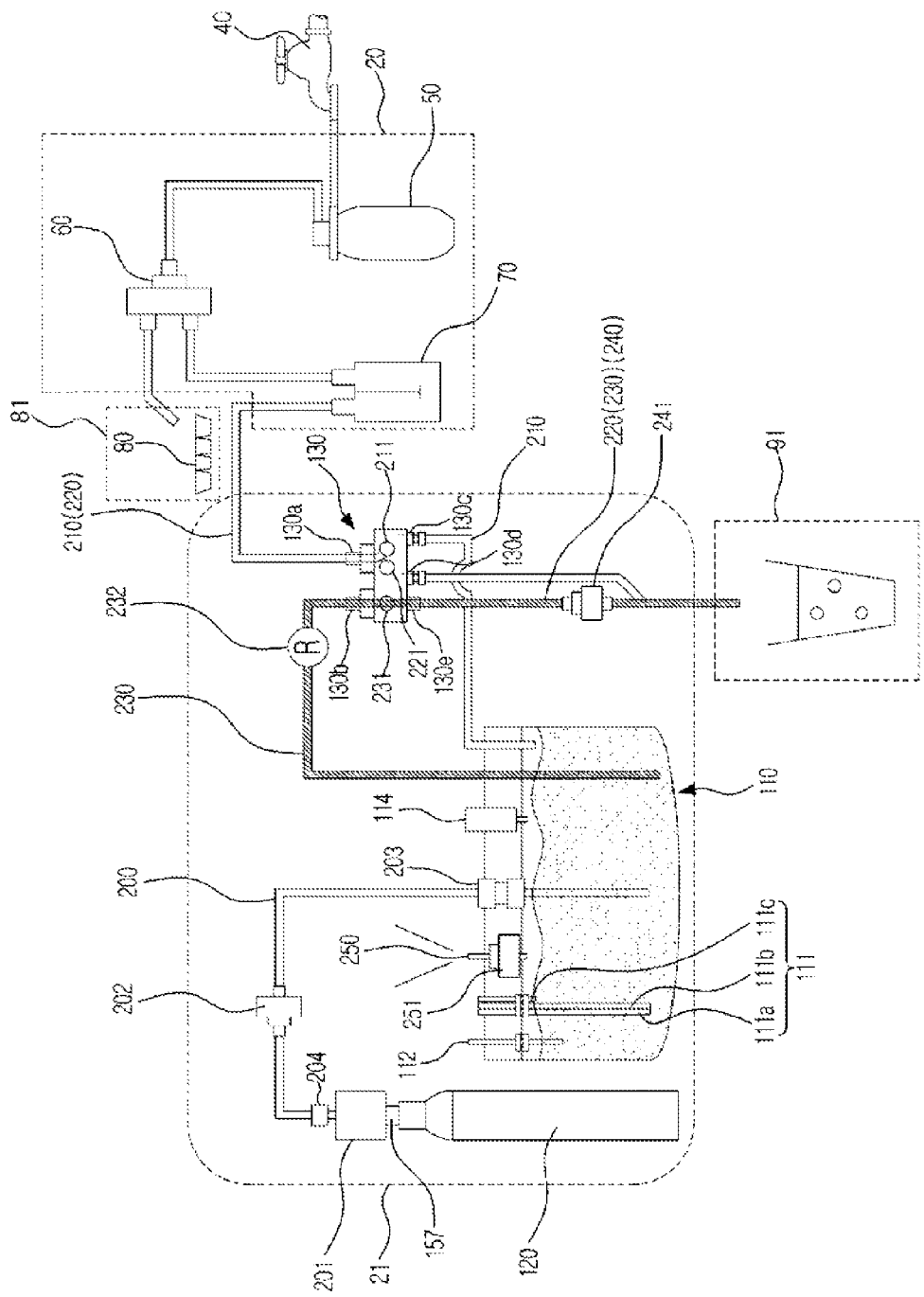
FIG. 13 is a view illustrating an exemplary carbonated water discharging method.

FIG. 12 is a view illustrating a carbonated water discharging method according to an embodiment of the present disclosure and FIG. 13 is a view illustrating an example of the carbonated water discharging method of FIG. 12.

A carbonated water discharging method 1100 is described with reference to FIGS. 12 and 13.

The refrigerator 1 may determine whether a command to discharge carbonated water is inputted (1110).

For example, when the third lever 93*c* (see, for example, FIG. 4) provided in the dispenser 90 is located at the sixth position P6 (see, for example, FIG. 4), and when the first lever 93*a* (see, for example, FIG. 4) is located at the second position P2 (see, for example, FIG. 4), the refrigerator 1 may determine that the command to discharge carbonated water is inputted.

When the command to discharge carbonated water is inputted (YES of 1110), the refrigerator 1 may discharge carbonated water through the dispenser 90 (1120).

The refrigerator 1 may open the carbonated water discharge valve 231 to discharge carbonated water. When the carbonated water discharge valve 231 is opened, carbonated water stored in the carbonated water tank 110 may be discharged through the carbonated water discharge flow path 230 by a carbon dioxide gas pressure remaining in the carbonated water tank 110. That is, carbonated water may be discharged to the carbonated water tank 110 by a pressure difference between an internal pressure of the carbonated water tank 110 and an air pressure.

The refrigerator 1 may estimate an amount of remaining carbonated water (1130). The amount of remaining carbonated water may represent an amount of carbonated water remaining in the carbonated water tank 110, and the amount of remaining carbonated water may be estimated based on a volume of the carbonated water tank 110 and an accumulated amount of discharged carbonated water (a sum of discharged carbonated water since carbonated water production).

Carbonated water may be discharged at a certain pressure by the carbonated water regulator 232. Therefore, the refrigerator 1 may estimate an amount of remaining carbonated water stored in the carbonated water tank 110 based on a total open period of time of the carbonated water discharge valve 231 (a cumulative discharge time of carbonated water) and an output pressure of the carbonated water regulator 232.

For example, in a state in which a volume of the carbonated water tank 110 is the same as an amount of carbonated water discharged for 1 minute, the refrigerator 1 may determine that an amount of remaining carbonated water is level 3 when a cumulative discharge time of carbonated water is less than 20 seconds. In addition, when a cumulative discharge time of carbonated water is within a range of 20~40 seconds, the refrigerator 1 may determine that remaining carbonated water is level 2, and when a cumulative discharge time of carbonated water is longer than 40 seconds, the refrigerator 1 may determine that remaining carbonated water is level 1.

When a flowmeter is provided on the carbonated water discharge flow path 230, the refrigerator 1 may estimate an amount of remaining carbonated water stored in the carbonated water tank 110 based on an output of the flowmeter.

For example, in a state in which carbonated water stored in the carbonated water tank 110 may be assumed to be a 600 ml, when a cumulative amount of discharged carbonated water is less than 200 ml, the refrigerator 1 may determine that an amount of remaining carbonated water is level 3, and when a cumulative amount of discharged carbonated water is within a range of 200 ml~400 ml, the refrigerator 1 may determine that an amount of remaining carbonated water is level 2. When a cumulative amount of discharged carbonated water is more than 400 ml, the refrigerator 1 may determine that an amount of remaining carbonated water is level 1.

The refrigerator 1 may display an amount of remaining carbonated water through the user interface 300 (1140).

The refrigerator 1 may display the estimated amount of remaining carbonated water, which is estimated at a step of 1140, by a emitting bar 341 provided in the carbonated water level displaying unit 340. For example, when an amount of remaining carbonated water is level 3, three emitting bars 341 may be emitted, and when an amount of remaining carbonated water is level 2, two emitting bars 341 may be emitted. In addition, an amount of remaining carbonated water is level 1, one emitting bar 341 may be emitted.

The refrigerator 1 may determine whether a command to terminate discharging carbonated water is inputted (1150).

For example, when the first lever 93*a* (see, for example, FIG. 4) provided in the dispenser 90 is located at the first position P1 (see, for example, FIG. 4), the refrigerator 1 may determine that the command to terminate discharging carbonated water is inputted. That is, the refrigerator 1 may discharge carbonated water as long as the first lever 93*a* (see, for example, FIG. 4) provided in the dispenser 90 is located at the second position P2 (see, for example, FIG. 4).

When the command to terminate discharging carbonated water is not inputted NO of 1150, the refrigerator 1 may estimate an amount of remaining of carbonated water again and display the amount of remaining of carbonated water.

When the command to terminate discharging carbonated water is inputted YES of 1150, the refrigerator 1 may stop discharging carbonated water (1160). Particularly, the refrigerator 1 may close the carbonated water discharge valve 231.

The refrigerator 1 may display the amount of remaining of carbonated water through the user interface 300 so that the user may easily verify the amount of remaining carbonated water.

The refrigerator 1 may separately discharge purified water from discharging carbonated water.

Particularly, when the third lever 93*c* (see, for example, FIG. 4) provided in the dispenser 90 is located at the fifth position P5 (see, for example, FIG. 4), and when the first lever 93*a* (see, for example, FIG. 4) is located at the second position P2 (see, for example, FIG. 4), the refrigerator 1 may determine that the command to discharge purified water is inputted.

As long as the first lever 93*a* (see, for example, FIG. 4) is located at the second position P2 (see, for example, FIG. 4), the refrigerator 1 may discharge purified water through the dispenser 90 (see, for example, FIG. 4) by opening the purified water discharge valve 221. In addition, when the first lever 93a (see, for example, FIG. 4) is located at the first position P1 (see, for example, FIG. 4), the refrigerator 1 may stop discharging purified water by closing the purified water discharge valve 221.

When a command to discharge purified water is inputted during supplying purified water to the carbonated water tank 110 for the carbonated water production, the refrigerator 1 may supply, e.g., preferentially supply purified water through the dispenser 90.

When the first lever 93a (see, for example, FIG. 4) is located at the second position P2 (see, for example, FIG. 4) while the purified water supply valve 211 is opened for the carbonated water production, the refrigerator 1 may close the purified water supply valve 211 and open the purified water discharge valve 221.

When the first lever 93a (see, for example, FIG. 4) is located at the first position P1 (see, for example, FIG. 4), the refrigerator 1 may close 221 and open the purified water supply valve 211.

That is, when the command to terminate discharging purified water is inputted, the refrigerator 1 may terminate discharging purified water and may start to supply purified water to the carbonated water tank 110.

Figure 14:
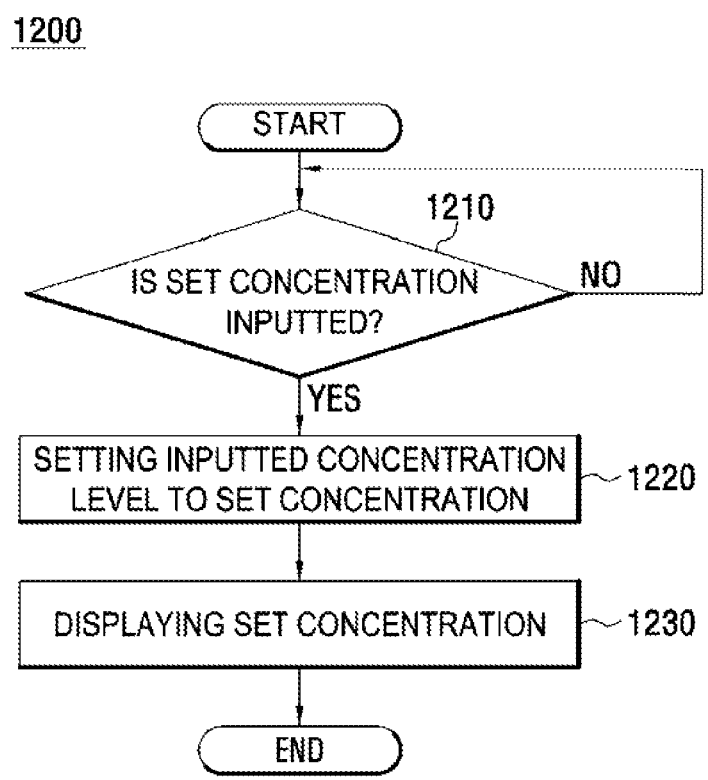
FIG. 14 is a view illustrating a setting method of a set concentration of carbonated water according to an embodiment of the present disclosure.

FIG. 14 is a view illustrating a setting method of a set concentration of carbonated water according to an embodiment of the present disclosure and FIGS. 15A-15D illustrate an example of the setting method of a predetermined concentration.

Referring to FIGS. 14 and 15A-15D, a setting method of a set concentration of carbonated water 1200 is described.

The refrigerator 1 may determine whether a set concentration is inputted (1210). The set concentration may represent a target concentration of carbonated water when the refrigerator 1 produces carbonated water. The refrigerator 1 may control the number of times carbon dioxide gas is supplied and a supply time based on the set concentration when producing carbonated water. That is, the refrigerator 1 may be capable of producing carbonated water having various carbon dioxide concentrations according to a set concentration.

For user convenience, the refrigerator 1 may receive a set concentration and divide into a plurality of levels.

Figure 15A:
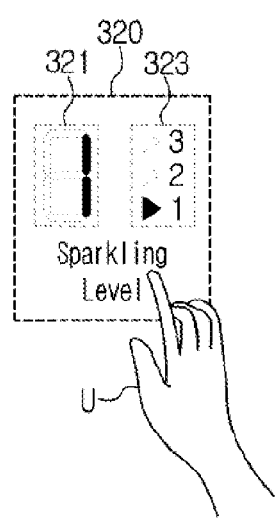
FIGS. 15A-15D illustrate an exemplary setting method of a predetermined concentration.

The user may directly input a concentration level, such as "level 1", "level 2", and "level 3". The user may input a command of increasing a set concentration for increasing a set concentration by one-step in a previous concentration level, and may input a command of lowering a set concentration for lowering a set concentration by one-step in a previous concentration level For example, the user may input the command of increasing a set concentration by touching the carbonated water concentration setting unit 320 provided in the user interface 300, as illustrated in FIG. 15A

When a set concentration is inputted, the refrigerator 1 may set an inputted set concentration as a set concentration (1220) and may display a set concentration (1230).

The refrigerator 1 may store a concentration level in the storage unit 400, wherein the concentration level is inputted through the user interface 300. Thus, the refrigerator 1 may set a set concentration. The refrigerator 1 may display a new set concentration by displaying the inputted concentration level on the user interface 300.

For example, when the command of increasing a set concentration is inputted, the refrigerator 1 may determine whether a previous set concentration is the highest concentration level. When the previous set concentration is not the highest concentration level, the refrigerator 1 may set a concentration, which is one step higher than the previous set concentration, to a set concentration. The refrigerator 1 may display a new set concentration on the user interface 300.

When the previous set concentration is the highest concentration level, the refrigerator 1 may set a set concentration to the lowest concentration level and may display a new set concentration on the user interface 300.

When a present set concentration is set to "level 1", the refrigerator 1 may display "level 1" on the setting concentration display unit 323 of the carbonated water concentration setting unit 320, as illustrated in FIG. 15A.

Figure 15B:
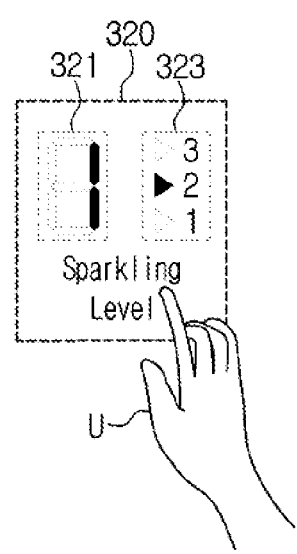

When the user inputs the command of increasing a set concentration by touching the carbonated water concentration setting unit 320, the refrigerator 1 may set a set concentration to "level 2" by increasing a set concentration by one level. The refrigerator 1 may display "level 2" on the setting concentration display unit 323, as illustrated in FIG. 15B.

Figure 15C:
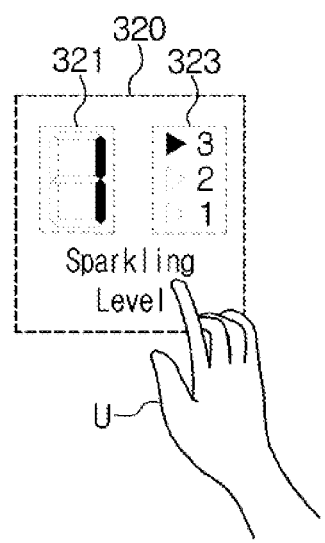

When the user inputs the command of increasing a set concentration again, the refrigerator 1 may set a set concentration to "level 3" by increasing a set concentration by one level. The refrigerator 1 may display "level 3" on the setting concentration display unit 323, as illustrated in FIG. 15C.

Figure 15D:
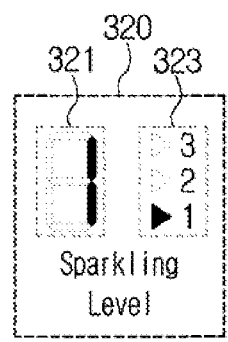

When a set concentration is the highest concentration level, that is "level 3", and when the user inputs the command of increasing a set concentration the refrigerator 1 may set a set concentration to the lowest concentration level, that is "level 1". The refrigerator 1 may display "level 1" on the setting concentration display unit 323, as illustrated in FIG. 15D.

The refrigerator 1 may display a set concentration of carbonated water to be distinguished from a present concentration. Thus the user may clearly recognize the present concentration and a concentration of carbonated water which is produced at the next time.

Figure 16:
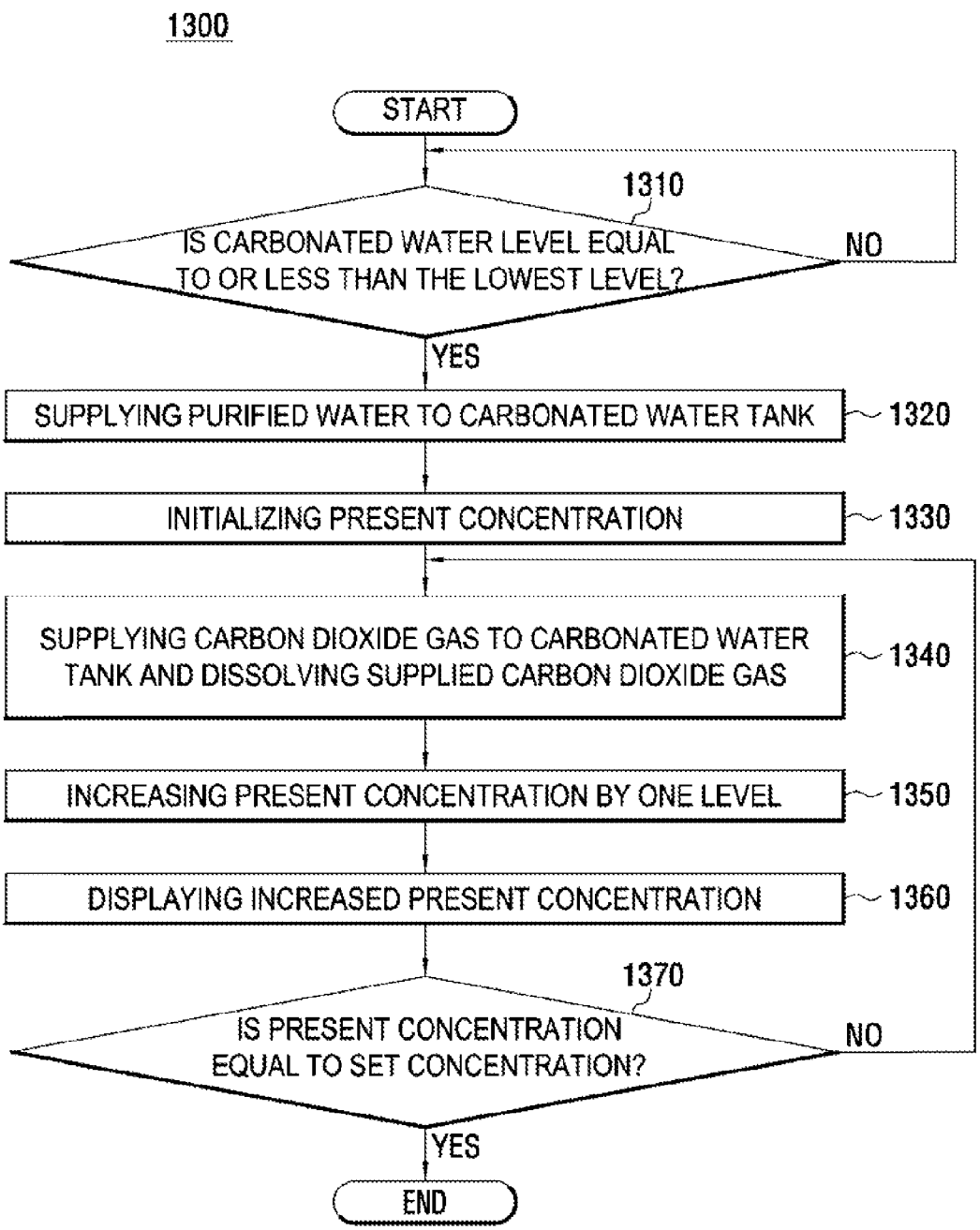
FIG. 16 is a view illustrating a carbonated water automatic production method according to an embodiment of the present disclosure.

FIG. 16 is a view illustrating a carbonated water automatic production method according to an embodiment of the present disclosure and FIGS. 17A-17B, 18A-18B, and 19A-19B are views illustrating an example of the carbonated water production method.

Referring to FIGS. 16, 17A-17B, 18A-18B, and 19A-19B, a carbonated water automatic production method 1300 is described to produce carbonated water automatically depending on a carbonated water level.

The refrigerator 1 may determine whether a carbonated water level stored in the carbonated water tank 110 is the lowest level (1310).

The refrigerator 1 may determine whether a carbonated water level is the lowest water level by various methods. For example, when the water level sensor 111 is capable of detecting the lowest water level, the refrigerator 1 may determine whether a carbonated water level is the lowest water level based on an output of the water level sensor 111. For example, when the water level sensor 111 is not capable of detecting the lowest water level, the refrigerator 1 may determine whether a carbonated water level is the lowest water level based on a cumulative amount of discharged carbonated water since producing carbonated water.

When the carbonated water level is the lowest water level (YES of 1310), the refrigerator 1 may supply purified water to the carbonated water tank 110 (1320). The refrigerator 1 may supply purified water to the carbonated water tank 110 until a purified water level may reach the highest water level.

For example, the refrigerator 1 may supply purified water to the carbonated water tank 110 by opening the purified water supply valve 211. The refrigerator 1 may open the 251 prior to opening the purified water supply valve 211 so as to smoothly supply purified water to the carbonated water tank 110.

When the purified water level is higher than the highest level, the refrigerator 1 may stop supplying purified water by closing the purified water supply valve 211.

The refrigerator 1 may initiate a present concentration of carbonated water (1330). The present concentration may represent a carbonated water concentration stored in the carbonated water tank 110. For user convenience, the refrigerator 1 may display the present concentration by dividing into a plurality of concentration levels.

For example, since purified water may be stored in the carbonated water tank 110, the refrigerator 1 may set a present concentration of present carbonated water to "level 0". That is, the refrigerator 1 may store "level 0" in an area of the storage unit 400 in which a present concentration is stored. The refrigerator 1 may display "level 0" on the present concentration display unit 321 of the user interface 300.

The refrigerator 1 may supply carbon dioxide gas to the carbonated water tank 110 and may dissolve supplied carbon dioxide gas (1340).

The refrigerator 1 may open the carbon dioxide gas supply valve 202 during a predetermined carbon dioxide gas supply time, and may stand by during a predetermined carbon dioxide gas dissolve time.

The predetermined carbon dioxide gas supply time and the predetermined carbon dioxide gas dissolve time may be changed depending on the present concentration.

The predetermined carbon dioxide gas supply time and the predetermined carbon dioxide gas dissolve time depending on the present concentration are described in detail.

The refrigerator 1 may increase the present concentration by one level (1350), and may display the increased present concentration (1360).

For example, when initially supplying carbon dioxide gas to the carbonated water tank 110 after supplying purified water to the carbonated water tank 110, the refrigerator 1 may set a present concentration to "level 1" and may display "level 1" on the present concentration display unit 321 of the user interface 300.

The refrigerator 1 may determine whether the present concentration is identical to a set concentration by comparing the present concentration with the set concentration (1370). That is, the refrigerator 1 may determine whether the present concentration which is newly set at a step of 1350 is identical to the set concentration inputted by the user.

When the present concentration is not identical to a set concentration (NO of 1370), the refrigerator 1 may perform supplying and dissolving carbon dioxide gas again, and may increase the present concentration by one level. For example, when the set concentration is "level 2" and the present concentration is "level 1", the may supply carbon dioxide gas to the carbonated water tank 110 again and may dissolve supplied carbon dioxide gas. The refrigerator 1 may set the present concentration to "level 2" again.

When the present concentration is identical to a set concentration (YES of 1370), the refrigerator 1 may terminate carbonate water production. For example, when the set concentration is "level 2" and the present concentration is "level 2", the refrigerator 1 may terminate carbonate water production.

The predetermined carbon dioxide gas supply time and the predetermined carbon dioxide gas dissolve time may be changed depending on the present concentration. That is because a period of time to dissolve carbon dioxide in carbonated water becomes longer as a carbon dioxide concentration of carbonated water is higher.

For example, when the present concentration is "level 0" (in a case when only purified water is stored in the carbonated water tank 110), the refrigerator 1 may open the carbon dioxide gas supply valve 202 during a first supply time (e.g., approximately 6 seconds) and may dissolve carbon dioxide gas during a first dissolve time (e.g., approximately 4 minutes). By the described-above method, the refrigerator 1 may produce carbonated water having level 1.

Figure 17A:
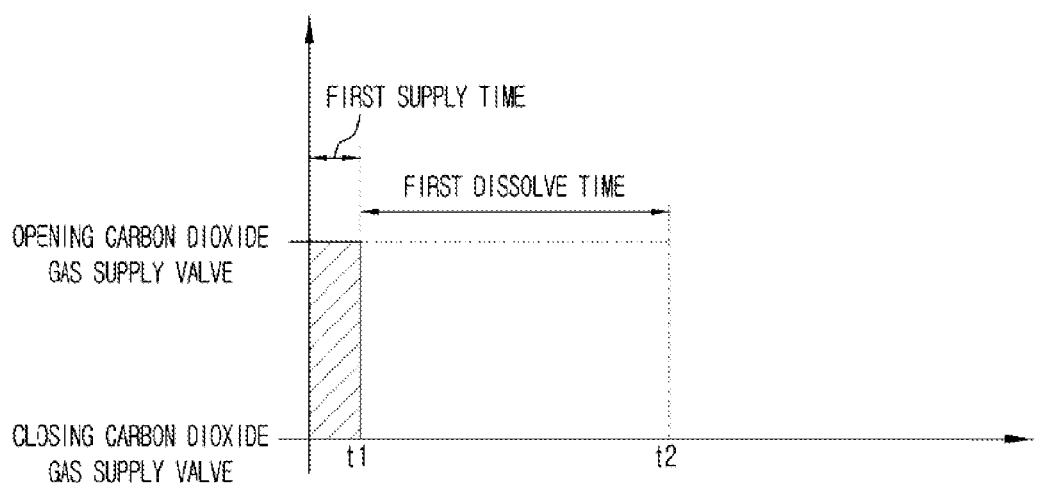
FIGS. 17A-17B, 18A-18B, and 19A-19B are views illustrating an exemplary carbonated water production method.
Figure 17B:
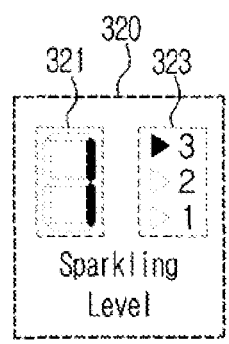

After producing the carbonated water having level 1, the refrigerator 1 may set a present concentration to "level 1" and may display "level 1" on the present concentration display unit 321, as illustrated in FIG. 17B.

When the present concentration is "level 1" (in a case carbonated water having level 1 is stored in the carbonated water tank 110), the refrigerator 1 may open the carbon dioxide gas supply valve 202 during a second supply time (e.g., approximately 4 seconds) and may dissolve carbon dioxide gas during a second dissolve time (e.g., approximately 8 minutes). Thus, the refrigerator 1 may produce carbonated water having level 2.

Figure 18A:
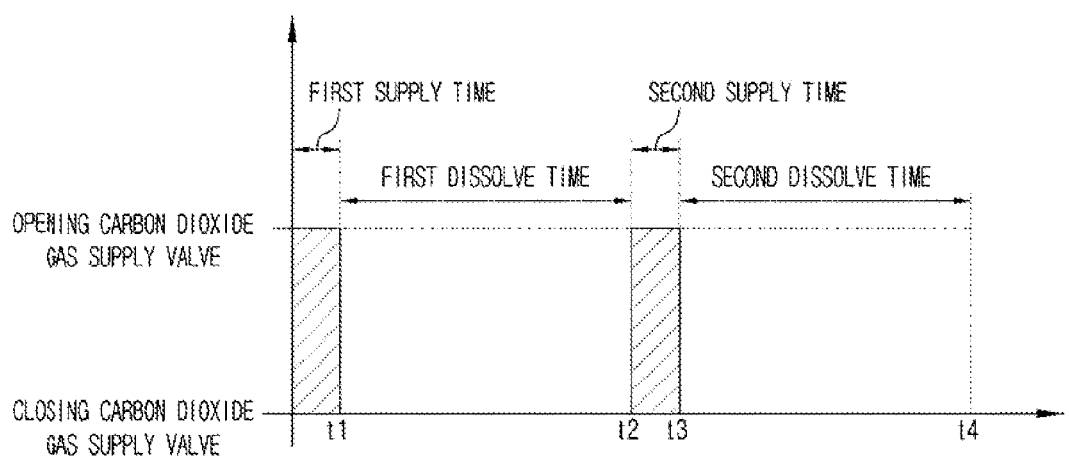
Figure 18B:
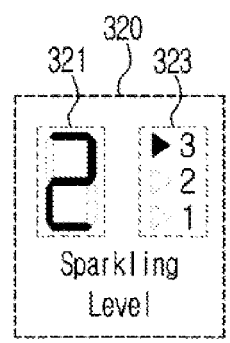

After producing the carbonated water having level 2, the refrigerator 1 may set a present concentration to "level 2" and may display "level 2" on the present concentration display unit 321, as illustrated in FIG. 18B.

When the present concentration is "level 2" (in a case carbonated water having level 2 is stored in the carbonated water tank 110), the refrigerator 1 may open the carbon dioxide gas supply valve 202 during a third supply time (e.g., approximately 5.5 seconds) and may dissolve carbon dioxide gas during a third dissolve time (e.g., approximately 12 minutes). Thus, the refrigerator 1 may produce carbonated water having level 3.

After producing the carbonated water having level 3, the refrigerator 1 may additionally supply carbon dioxide gas during a fourth supply time (e.g., approximately 5.5 seconds). This is because a carbon dioxide gas pressure of the inside of the carbonated water tank 110 may be maintained at a certain level.

Figure 19A:
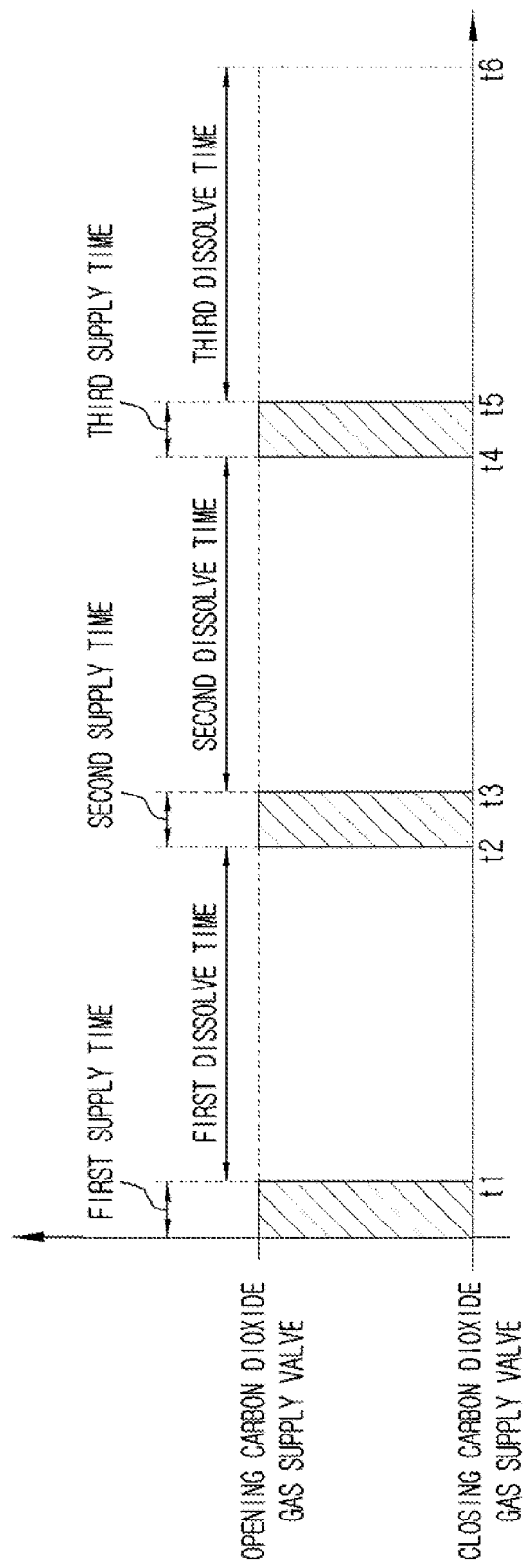
Figure 19B:
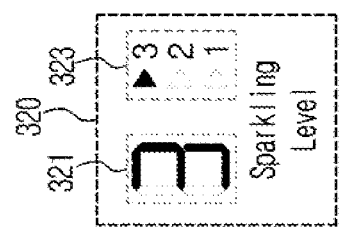

After producing the carbonated water having level 3, the refrigerator 1 may set a present concentration to "level 3" and may display "level 3" on the present concentration display unit 321, as illustrated in FIG. 19B.

By displaying both a set concentration of carbonated water and a present concentration, the user may easily verify carbonated water production situations.

Figure 20:
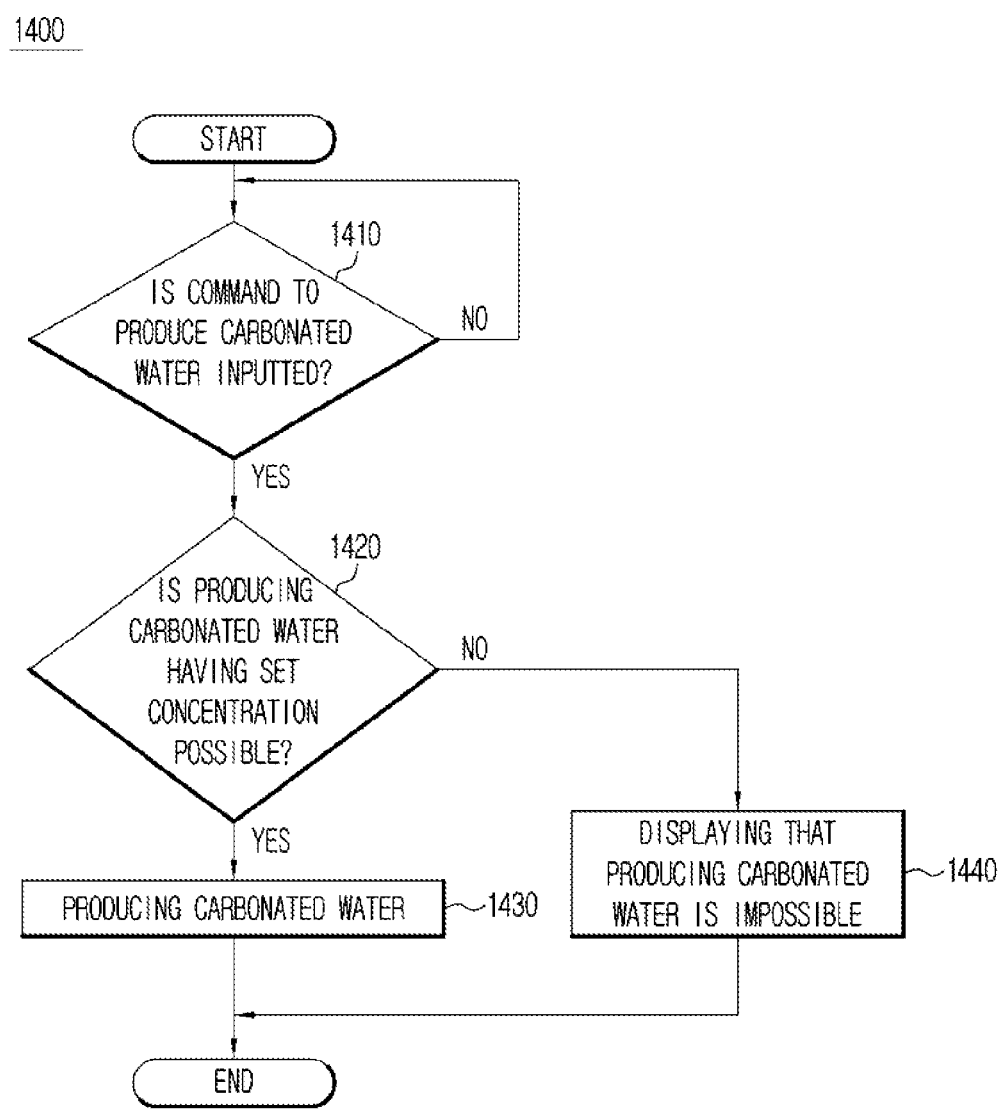
FIG. 20 is a view illustrating a carbonated water manual production method according to an embodiment of the present disclosure.

FIG. 20 is a view illustrating a carbonated water manual production method according to an embodiment of the present disclosure.

Referring to FIG. 20, a carbonated water manual production method 1400 is described to produce carbonated water manually by a command from the user.

The refrigerator 1 may determine whether a command to produce carbonated water is inputted (1410). The command to produce carbonated water may represent a command to produce immediately carbonated water after receiving the command. Thus, the refrigerator 1 may start to produce carbonated water regardless of whether a carbonated water level is the highest level when the command to produce carbonated water is inputted.

The user may input the command to produce carbonated water through the user interface 300. For example, the user may input the command to produce carbonated water by touching the carbonated water producing activation unit 310 of the user interface 300 during a certain period of time (e.g., more than 3 seconds). In addition, the user may input a command to produce a carbonated water at high-speed by touching the carbonated water high-speed producing unit 330 of the user interface 300.

When the command to produce carbonated water is inputted (YES of 1410), the refrigerator 1 may determine whether it is possible to produce carbonated water having a set concentration (1420).

The refrigerator 1 may determine whether it is possible to produce carbonated water having a set concentration based on a ratio of remaining carbonated water, a present concentration of carbonated water, and a set concentration. The ratio of remaining carbonated water may represent a ratio between an amount of remaining carbonated water in the carbonated water tank 110 and a volume of the carbonated water tank 110. The refrigerator 1 may estimate the ratio of remaining carbonated water based on a cumulative discharge time of carbonated water after producing carbonated water.

The refrigerator 1 may increase an amount of carbon dioxide gas dissolved in carbonated water at a short time, but the refrigerator 1 may reduce an amount of carbon dioxide gas dissolved in carbonated water at a relatively long time. Therefore, when multiplying a set concentration by a volume of the carbonated water tank 110, which is corresponding to an amount of carbon dioxide gas having a set concentration, is smaller than a value obtained by multiplying a present concentration by an amount of remaining carbonated water, which is corresponding to an amount of carbon dioxide gas having a present concentration, the refrigerator 1 may not immediately produce carbonated water having the set concentration.

For example, when the set concentration is equal to, or larger than, a value obtained by multiplying a ratio of remaining carbonated water by the present concentration by comparing the set concentration with a value obtained by multiplying a ratio of remaining carbonated water by the present concentration, the refrigerator 1 may determine that it is possible to produce carbonated water having the set concentration For example, when the set concentration is higher than the present concentration, the refrigerator 1 may produce carbonated water having the set concentration. When a carbonated water level stored in the carbonated water tank 110 is identical to the highest level and when the present concentration is "level 1" and the set concentration is "level 3", the refrigerator 1 may produce carbonate water having a concentration of level 3 by additionally supplying carbon dioxide gas.

When an amount of remaining carbonated water is small although the set concentration is lower than the present concentration, the refrigerator 1 may produce carbonated water having the set concentration. When an amount of remaining carbonated water having "level 3" present concentration is less than one third of the highest level and when the set concentration is "level 1", the refrigerator 1 may produce carbonated water having "level 1" concentration by additionally supplying purified water to the highest level.

By comparing the set concentration with a value obtained by multiplying a ratio of remaining carbonated water by the present concentration, the refrigerator 1 may determine that it is impossible to produce carbonated water having the set concentration when the set concentration is less than a value obtained by multiplying a ratio of remaining carbonated water by the present concentration.

For example, when the set concentration is less than the present concentration, and when the amount of remaining carbonated water is large, the refrigerator 1 may not produce carbonated water having the set concentration. For example, when an amount of remaining carbonated water having "level 3" present concentration reaches the highest water level, and when a set concentration is "level 1", the refrigerator 1 may not immediately produce carbonated water having level 1 concentration due to incapable of additionally supplying purified water.

When it is possible to produce carbonated water having the set concentration (YES of 1420), the refrigerator 1 may start to produce carbonated water (1430). The refrigerator 1 may display producing carbonated water having the set concentration through the user interface 300.

The refrigerator 1 supply purified water to the carbonated water tank 110 to the highest water level, and may supply carbon dioxide gas based on an amount of remaining carbonated water, a present concentration of carbonated water, and a set concentration set by the user.

For example, When a set concentration is "level 1" and an amount of remaining carbonated water having level 3 present concentration is one third of the highest level, the refrigerator 1 may supply purified water to the highest level.

For example, When a set concentration is "level 3" and an amount of remaining carbonated water having level 2 present concentration is half of the highest level, the refrigerator 1 may supply purified water to the highest level and may supply carbon dioxide gas by two times.

During carbonated water production, the refrigerator 1 may display the present concentration on the present concentration display unit 321.

When it is impossible to produce carbonated water having the set concentration (NO of 1420), the refrigerator 1 may display that carbonated water having the set concentration is not produced (1440).

By producing immediately carbonated water according to commands from the user, the refrigerator 1 may quickly provide carbonated water having a concentration which is requested by the user.

According to an exemplary embodiment of the refrigerator, the user may clearly recognize a present concentration of carbonated water and a set concentration of carbonated water related to carbonated water production By using the refrigerator, the user may easily verify an amount of remaining carbonated water related discharging carbonated water.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A refrigerator comprising:
 a user interface configured to display a plurality of levels each indicating a number of times that a supplying of carbon dioxide gas and a dissolving of the supplied carbon dioxide gas in water are performed, each of the displayed plurality of levels selectable by a user of the refrigerator;
 a carbonated water producing apparatus including a carbonated water tank and configured to produce carbonated water of different concentrations of carbon dioxide gas dissolved in water by supplying the water and the carbon dioxide gas to the carbonated water tank; and
 a controller configured to control the carbonated water producing apparatus to produce the carbonated water according to a level of the displayed plurality of levels indicating the number of times that the supplying of carbon dioxide gas and the dissolving of the supplied carbon dioxide gas are performed selected by the user at the user interface, and to control the user interface to display the level indicating the number of times that the supplying of carbon dioxide gas and the dissolving of the supplied carbon dioxide gas are performed selected by the user and a level of a concentration of carbon dioxide gas dissolved in the water stored in the carbonated tank of the carbonated water producing apparatus.

2. The refrigerator according to claim 1, wherein:
the controller controls the carbonated water producing apparatus so that the carbonated water producing apparatus supplies the carbon dioxide gas to be dissolved in the water at least once according to a target concentration based on the level indicating the number of times that the supplying of carbon dioxide gas and the dissolving of the supplied carbon dioxide gas selected by the user.

3. The refrigerator according to claim 2, wherein:
the controller controls the user interface to display the concentration of the carbonated water according to the number of times the carbon dioxide gas is supplied to the carbonated water tank.

4. The refrigerator according to claim 3, wherein:
the controller determines an amount of time the carbon dioxide gas is supplied based on the concentration of the carbonated water.

5. The refrigerator according to claim 1, wherein:
the user interface displays an amount of the carbonated water stored in the carbonated water tank.

6. The refrigerator according to claim 5, further comprising:
a dispenser configured to discharge the carbonated water from the refrigerator.

7. The refrigerator according to claim 6, wherein
the controller determines the amount of the carbonated water stored in the carbonated water tank, based on an amount of time the carbonated water is discharged through the dispenser.

8. The refrigerator according to claim 6, wherein
the controller determines the amount of the carbonated water stored in the carbonated water tank based on an amount of discharged carbonated water discharged through the dispenser.

9. The refrigerator according to claim 1, wherein
the controller determines whether to produce the carbonated water based on a ratio of a present amount of the carbonated water to a maximum amount of the carbonated water and the concentration of the carbonated water when a command to produce carbonated water is inputted by the user at the user interface.

10. The refrigerator according to claim 9, wherein
the controller controls the user interface to display that carbonated water production is not possible when a target concentration is smaller than a value obtained by multiplying a ratio by the concentration of carbonated water stored in the carbonated water tank.

11. The refrigerator according to claim 9, wherein
the controller controls the user interface to display producing carbonated water having the target concentration when the target concentration is equal to or larger than a value obtained by multiplying the ratio by the concentration of carbonated water stored in the carbonated water tank.

* * * * *